United States Patent [19]

Freeman et al.

[11] 3,981,581
[45] Sept. 21, 1976

[54] DRIVE SYSTEM FOR SHIFTING A MIRROR ASSEMBLY

[76] Inventors: Lawrence M. Freeman, 599 Ansley Court, NE., Atlanta, Ga. 30324; Francis T. Arnold, 2379 Tristan Circle, NE., Atlanta, Ga. 30345

[22] Filed: June 17, 1974

[21] Appl. No.: 479,879

Related U.S. Application Data

[60] Division of Ser. No. 304,519, Nov. 7, 1972, which is a continuation-in-part of Ser. No. 146,114, May 24, 1971, Pat. No. 3,730,622.

[52] U.S. Cl. ................................... 355/44; 355/5; 355/45
[51] Int. Cl.² ............................................ G03B 13/24
[58] Field of Search ........................... 355/45, 44, 5

[56] References Cited
UNITED STATES PATENTS 3,730,622  5/1973  Freeman et al. .................. 355/45 X

*Primary Examiner*—R. L. Moses
*Attorney, Agent, or Firm*—B. J. Powell

[57] ABSTRACT

A drive system for selectively pivoting a pivotally mounted member, especially a mirror-shutter assembly of a reader-printer apparatus including a driving element movable along a first path and a driven element movable along a second path operatively connected to the pivotally mounted member whereby the driving element engages and moves the driven element from a first position to a second position as the driving element moves along a first portion of the first path in a prescribed direction and whereby the driving element engages and moves the driven element from the second position to the first position as the driving element moves along a second portion of the path in the prescribed direction.

4 Claims, 35 Drawing Figures

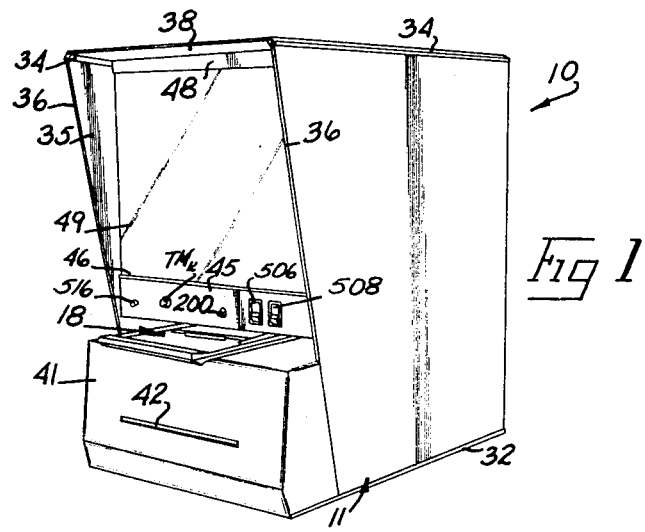
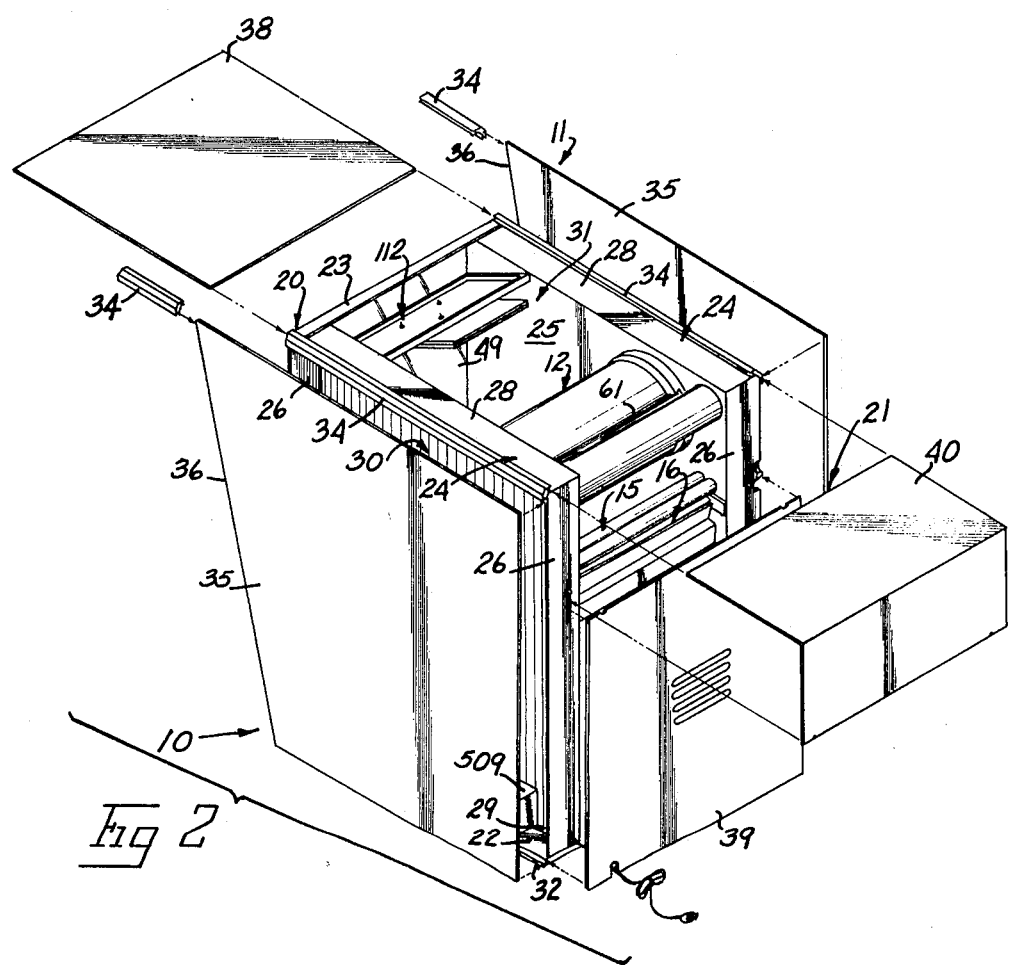

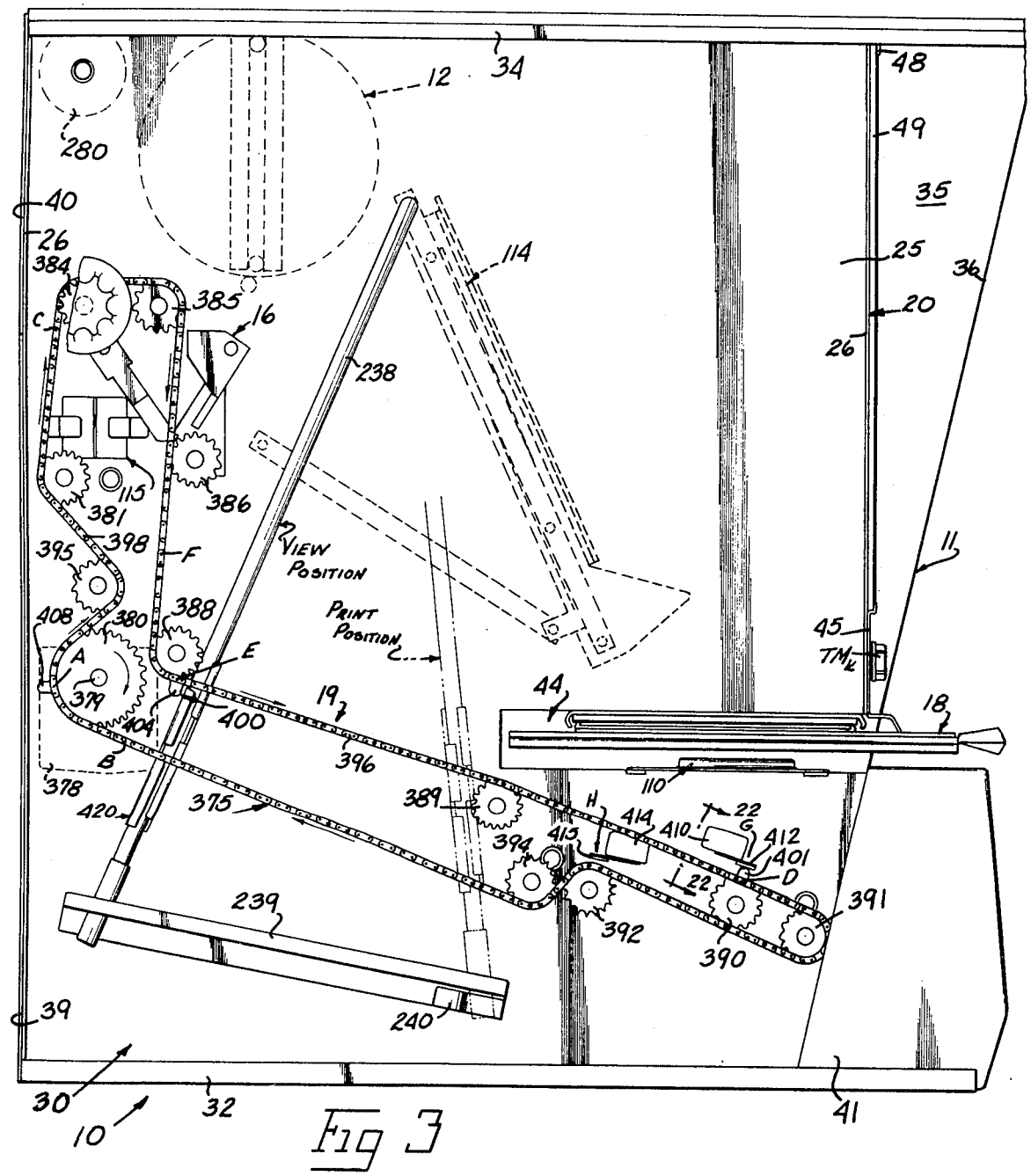

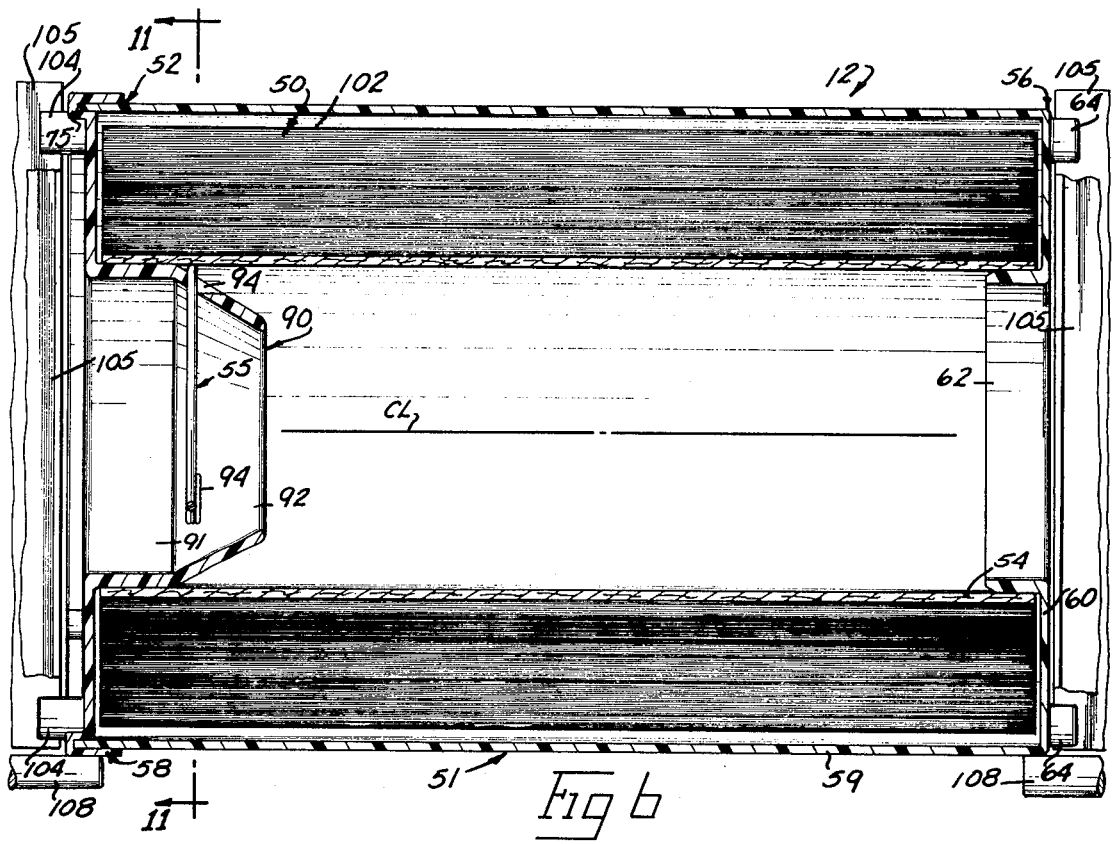
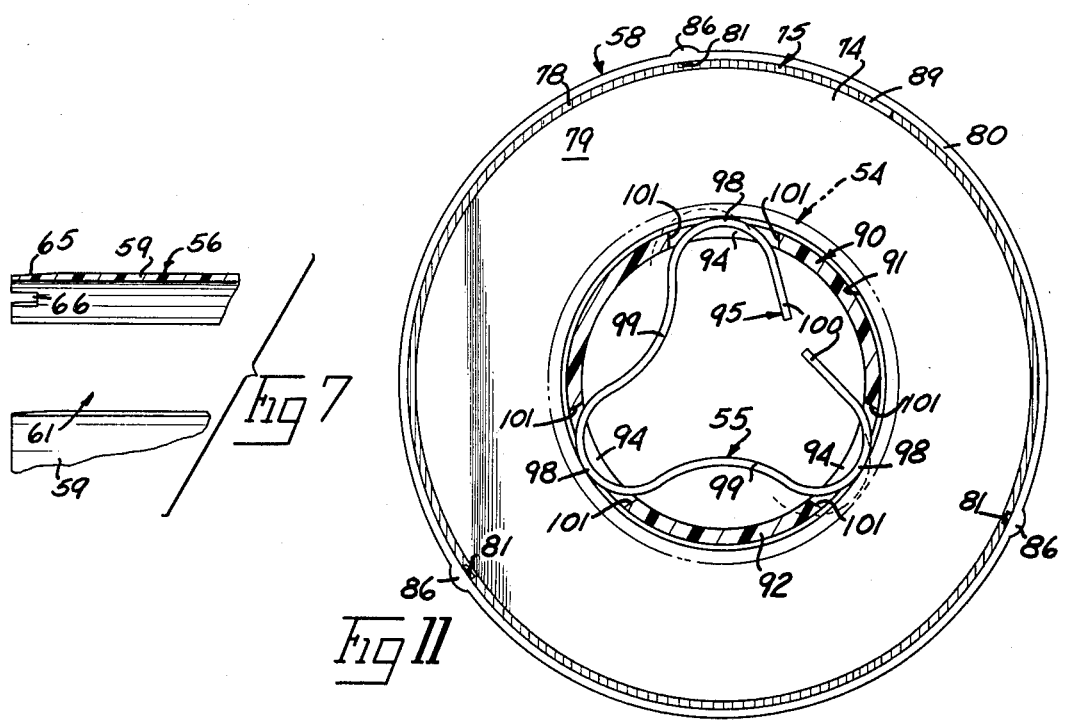

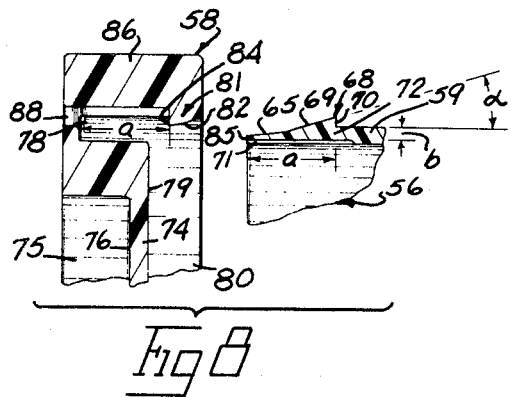
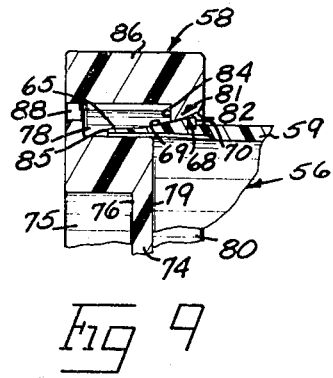
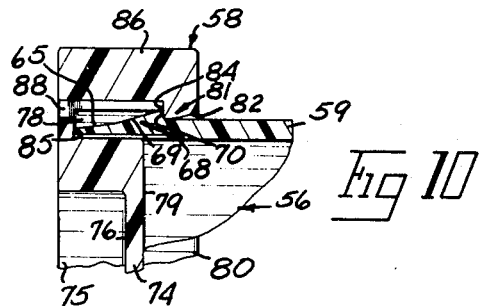
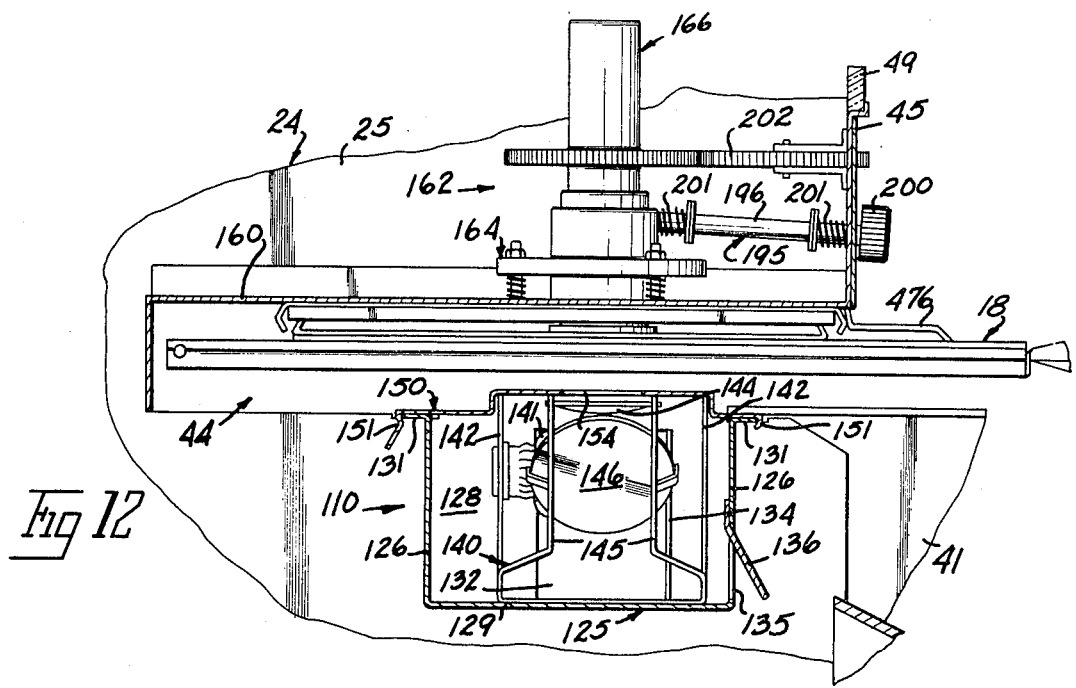

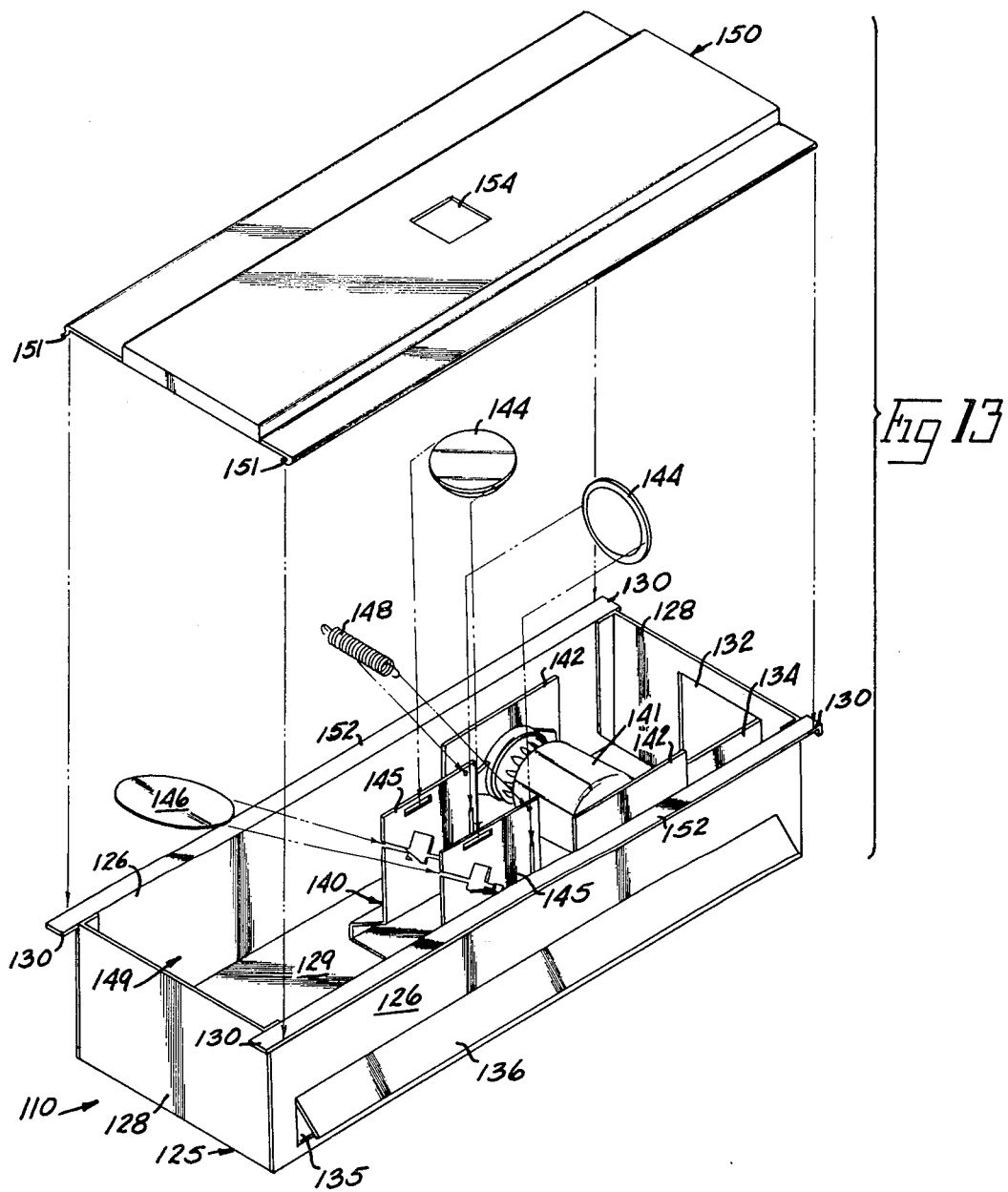

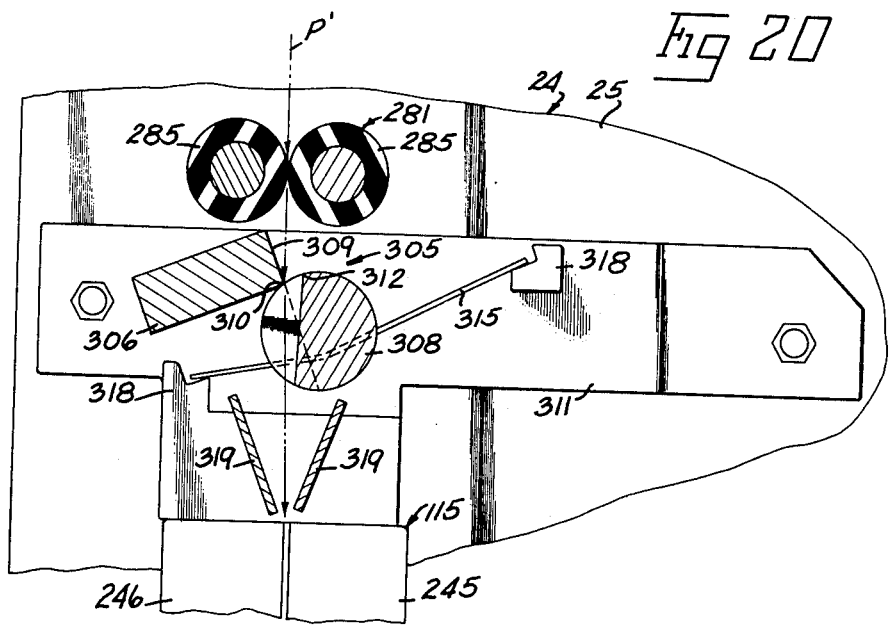
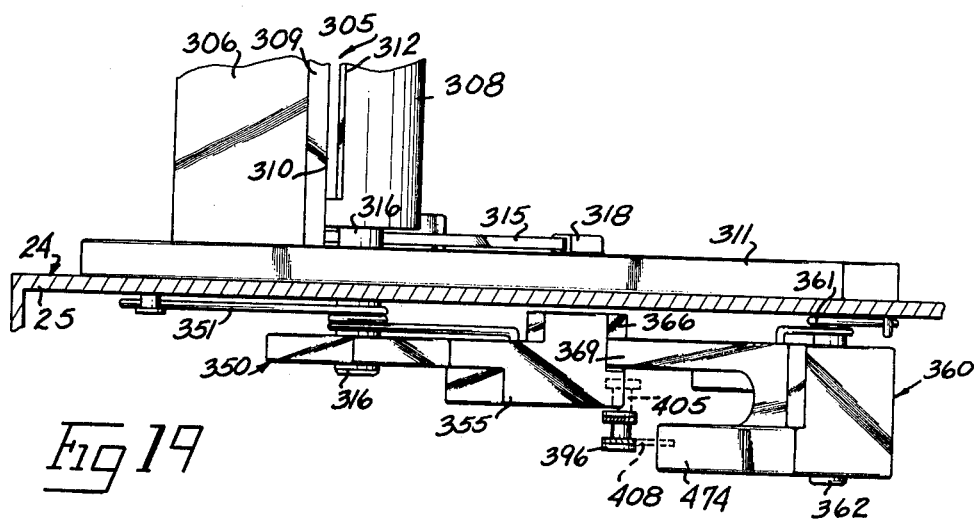

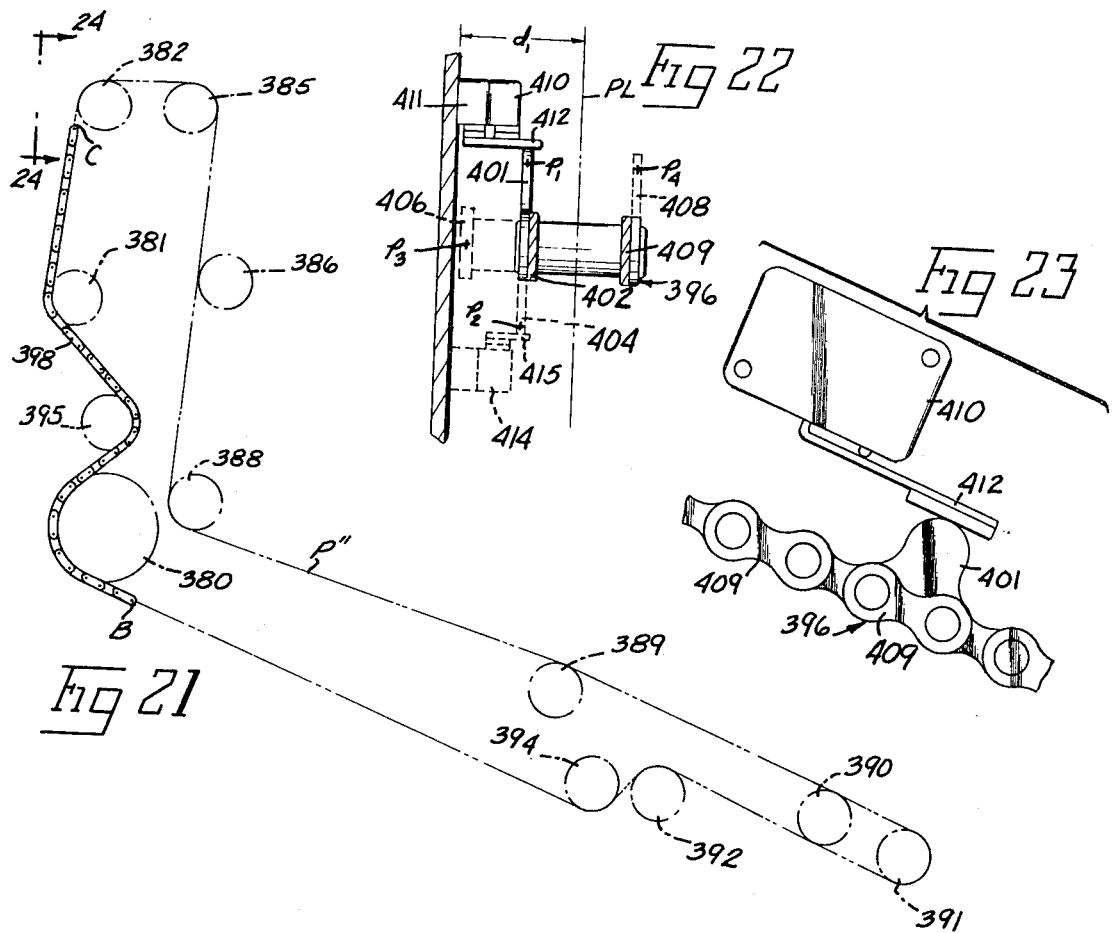

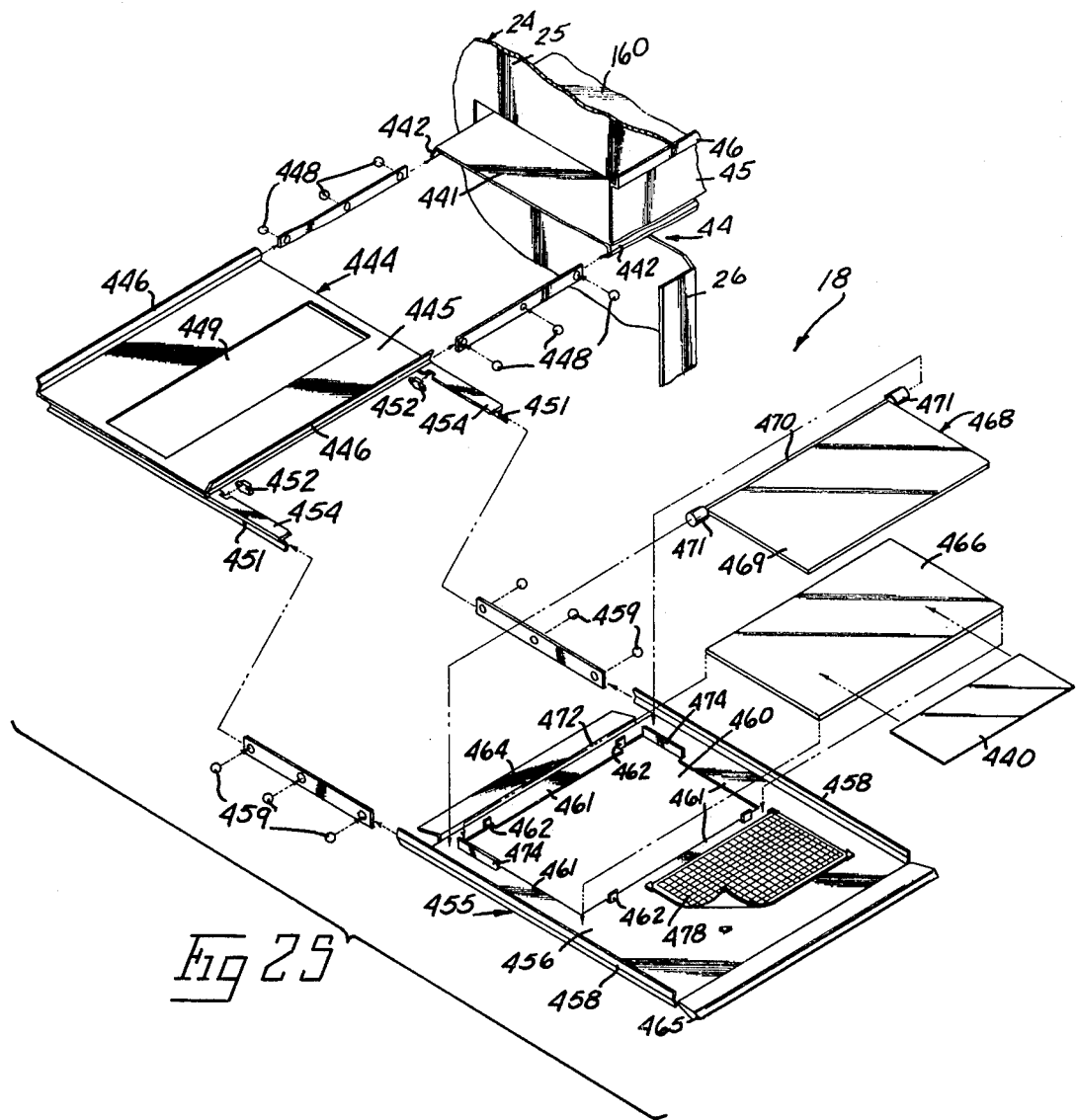

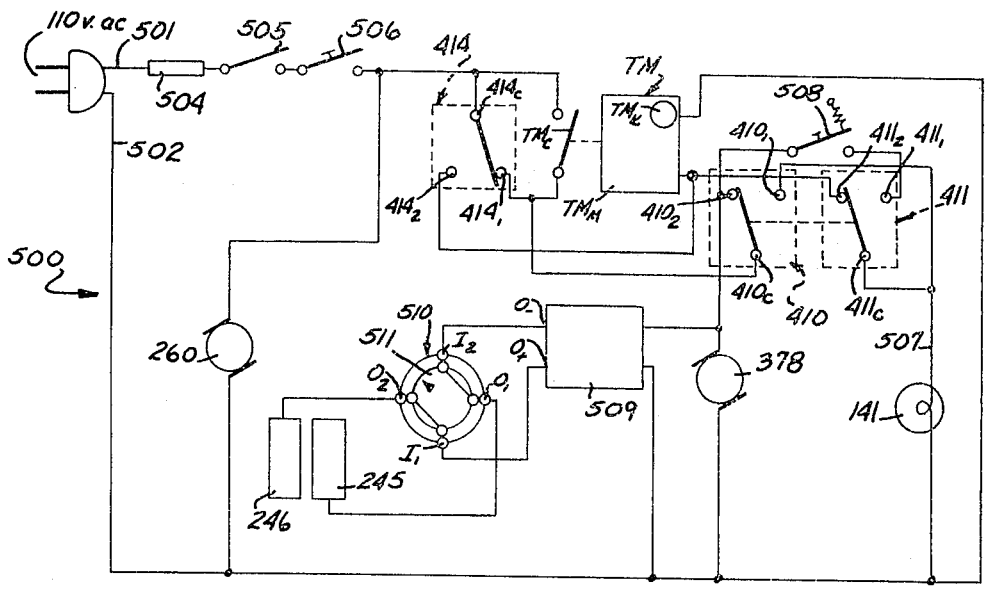
Fig 26
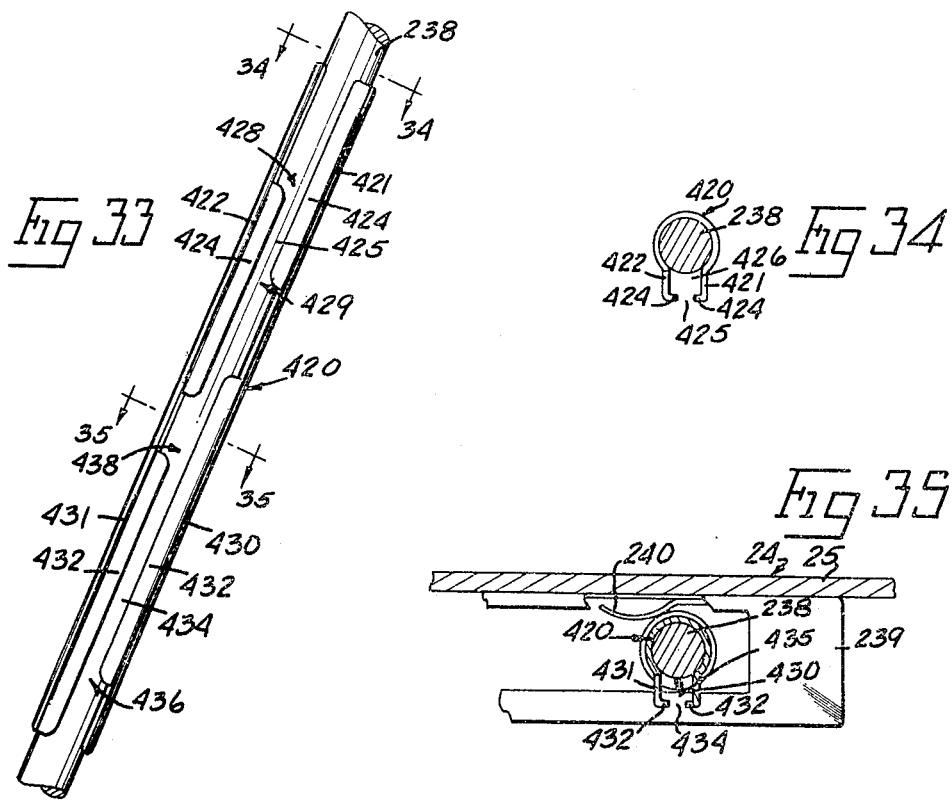
Fig 33
Fig 34
Fig 35

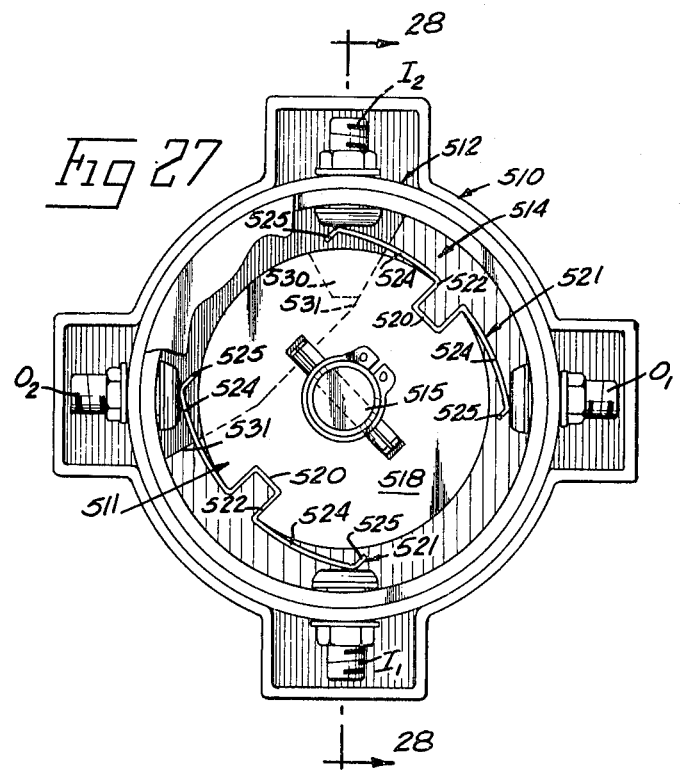
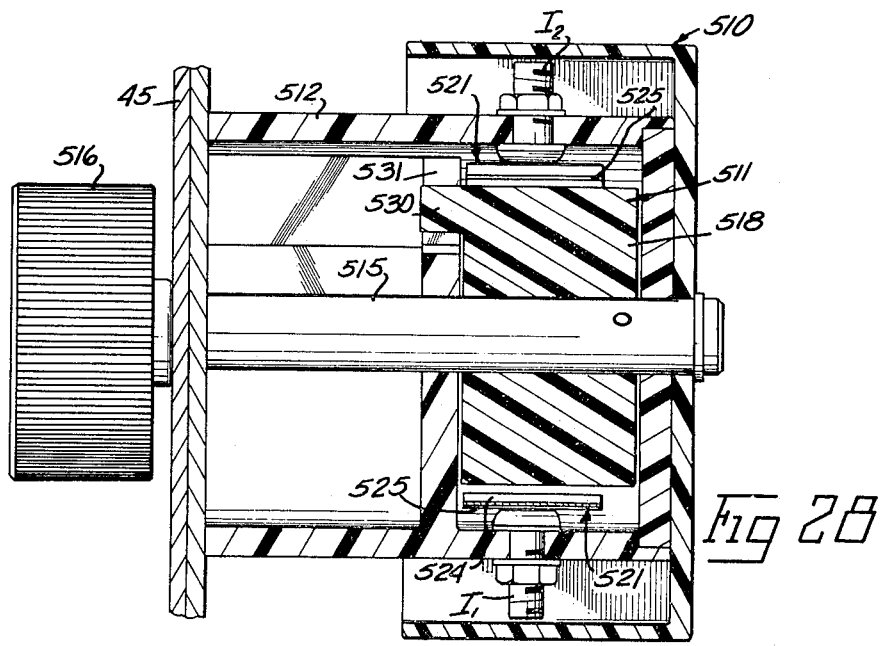

DRIVE SYSTEM FOR SHIFTING A MIRROR ASSEMBLY

CROSS-REFERENCE TO RELATED APPLICATIONS

This application is a division of our co-pending application Ser. No. 304,519, filed Nov. 7, 1972 for "Reader-Printer Apparatus" which is in turn a continuation-in-part of our still earlier application Ser. No. 146,114, filed May 24, 1971 for "Microfilm Viewer-Printer", now U.S. Pat. No. 3,730,622, but pending on Nov. 7, 1972.

BACKGROUND OF THE INVENTION

Various machines are available on the market today for electrostatically copying the visual image on an original document medium onto copy paper. Usually, the various components of these machines are independently driven with the operation controlled by the use of switch elements operated by the leading edge of the copy paper. Because of the sensitivity required for paper actuated switches, these prior art machines have been difficult to properly adjust and to maintain. Moreover, because a relativley large number of components required for these prior art machines, the manufacture thereof has been expensive. Because of the synchronization required to seccessfully copy, these prior art machines have frequently become out of adjustment resulting in excessive loss of production and in the necessity of having technically trained personnel available to repair same.

SUMMARY OF THE INVENTION

These and other problems and disadvantages associated with the prior art are overcome by the invention disclosed herein by providing a machine which has a minimum number of components, and is efficient in operation. Thus, not only is the manufacturing cost minimized, but also the operating and maintenance cost. The machine provides a single endless member which both drives the various components of the machine and carries the control elements for controlling the operation of the machine independently of the position of the copy paper.

Generally, the apparatus of the invention includes a supply of copy paper, an image forming means, a conveyor means for moving the copy paper through the image forming means, and a combination driving and control means for operating the image forming means and conveyor means. The image forming means includes charging means for imposing an electrostatic charge on the copy paper, projection means for projecting the image from the original document medium onto the copy paper to expose same at an exposure station, and developing means for applying toner particles to the exposed copy paper at a developing station to develop the latent electrostatic image on the copy paper into a visual image. In the microfilm reader-printer embodiment of the invention, a shutter-mirror assembly is provided for selectively projecting the visual image from the original document medium onto a viewing screen while at the same time preventing the image from being projected to the exposure station.

The conveyor means includes a paper feed means for feeding the copy paper from the supply of copy paper in single sheet fashion toward the image forming means, the exposure conveyor means for receiving the copy paper from the paper feed means and positioning same at the exposure station, and discharge means for receiving the exposed and developed copy paper after passage through the developing station.

A paper cutter mechanism is provided for cutting the copy paper to length after a prescribed amount of paper has been fed by the paper feed means. The mechanism has a cocked position in which it is spring urged toward a cutting position through which the cutter moves upon release from the cocked position to cut the paper.

The endless member is flexible and drivingly connects a main drive motor to the exposure conveyor means and discharge means to drive same when the main drive motor is operated. A secondary flexible engaging member of a prescribed length is carried by the endless member at a prescribed location thereon to selectively drivingly engage the paper feed means for a prescribed period of time during print cycle to feed a prescribed length of paper toward the image forming means. The control means includes a plurality of control switches spaced along the prescribed path of the endless member and a plurality of switch actuating members carried by the endless member at prescribed locations thereon to operativly engage only a corresponding one of the control switches to operate same. An additional operating member is also carried by the endless member for moving the paper cutter mechanism to its cocked position, and a release operating member is carried by the endless member for releasing the cutter mechanism to cut the copy paper to length. In the microfilm reader-printer, the operating member used to cock the cutter mechanism is also used to transfer the shutter-mirror assembly from its viewing position to its printing position and then back to its viewing position during a printing cycle.

The supply of copy paper is in the form of a roll which is carried in a paper cassette. The roll of copy paper is carried on a support tube rotatably mounted in a housing. A braking means is carried by the housing for internally braking the support tube. The housing is designed for a single use which lends itself to assembly with the roll of copy paper therein but is destroyed upon disassembly to prevent reloading same.

These and other features and advantages of the invention will become more clearly understood upn consideration of the following detailed description and accompanying drawings wherein like characters of reference designate corresponding parts throughout the several views and in which:

BRIEF DESCRIPTION OF THE DRAWINGS

FIG. 1 is a front perspective view illustratiing the invention embodied in a microfilm reader-printer for use with microfiche;

FIG. 2 is an exploded perspective view of the machine of FIG. 1 taken from the rear of the machine to show the cabinet construction;

FIG. 3 is a side elevational view of the drive side of the machine of FIG. 1 with the side panel removed to show the combination driving and control means;

FIG. 6 is a longitudinal cross-sectional view of the paper cassette of the invention;

FIG. 7 is a partial longitudinal cross-sectional view of the main cylinder of the paper cassette;

FIG. 8 is an enlarged partial cross-sectional view showing the end cap and main cylinder of the paper cassette ready for assembly;

FIG. 9 is a view similar to FIG. 8 showing the end cap and main cylinder during assembly;

FIG. 10 is a view similar to FIG. 8 showing the end cap and main cylinder assembled;

FIG. 11 is an enlarged cross-sectional view of the end cap taken along line 11—11 in FIG. 6 showing the brake;

FIG. 12 is an enlarged portion of the cross-sectional view of FIG. 4 showing the construction of the light source assembly and the projection unit;

FIG. 13 is an exploded perspective view of the light source assembly;

FIG. 19 is a top view of the cutter drive means in the cocked position;

FIG. 20 is a cross-sectional view through knife assembly of the cutter means taken longitudinally of the machine;

FIG. 21 is an elevational view showing the secondary chain of the drive and control means;

FIG. 22 is a view taken along line 22—22 in FIG. 3 with the various cam and switch members superimposed thereon;

FIG. 23 is an enlarged elevational view of a portion of the main drive chain;

FIG. 24 is an enlarged view taken along line 24—24 in FIG. 21;

FIG. 25 is an exploded perspective view of the fiche carrier assembly;

FIG. 26 is an electrical schematic diagram for the machine;

FIG. 27 is an elevational view of the polarity switch with portions thereof removed to show the interior construction thereof;

FIG. 28 is a cross-sectioanl view taken along line 28—28 in FIG. 27;

FIG. 33 is an enlarged view of the drive arm of the shutter-mirror assembly;

FIG. 34 is a cross-sectional view taken along line 34—34 in FIG. 33; and

FIG. 35 is a cross-sectional view taken along line 35—35 in FIG. 33.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Figure 4:
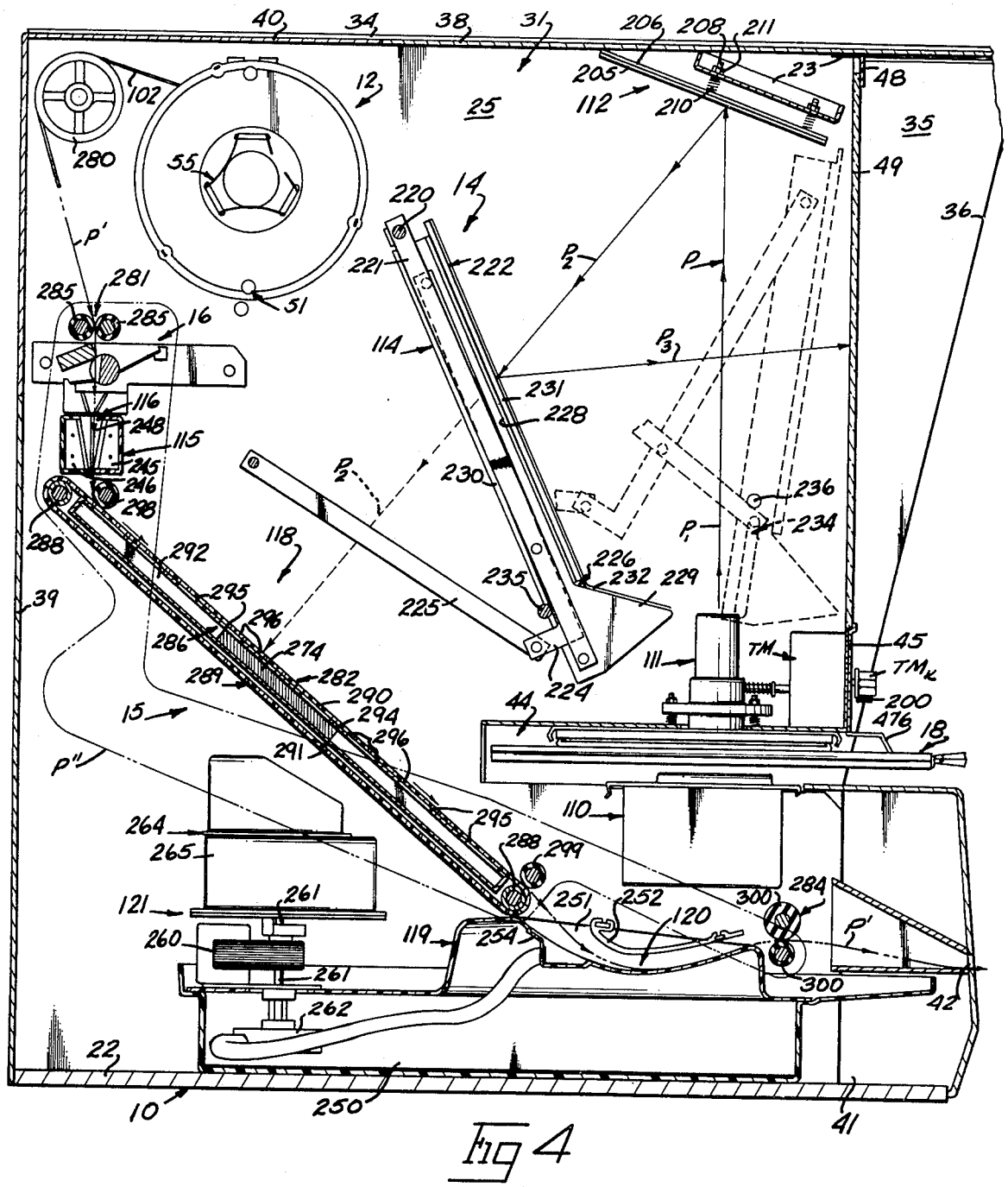
FIG. 4 is a longitudinal cross-sectional view of the machine of FIG. 1 showing the internal construction thereof.

Referring to the figures, especially FIG. 1, it will be seen that the invention is disclosed herein as a microfilm reader-printer, however, it is to be understood that the inventive concept may be embodied in other machines such as a copying machine. The machine 10 disclosed in FIG. 1 is designed for use in copying the visual image from a microfiche. As best seen in FIGS. 2, 3 and 4, the machine 10 includes generally a cabinet 11, a supply of copy paper 12, an image forming means 14, a conveyor means 15, a cutter means 16, a carrier assembly 18 and a drive and control means 19. Generally, the machine is operated by placing a piece of microfiche in the carriage assembly 18, the controls of the image forming means operated to project the visual image from the microfiche to a viewing position for viewing a selected portion of the microfiche and then to an exposure position to print the selected portion of the microfiche shown in the viewing position onto a piece of copy paper from the supply of copy paper 12.

CABINET

The cabinet 11 includes generally a frame 20 with a cover assembly 21 enclosing same as best seen in FIGS. 1 and 2. The frame 20 includes a rectangular base 22 and a pair of upstanding, spaced apart side frames 24 attached to and extending upwardly from opposite sides of base 22 and connected by cross braces 23. Each of the side frames 24 includes central upstanding rectangular support plate 25 having outwardly directed front and rear flanges 26 and a top flange 28, all of which are flush with a vertical plane at the side edges of the base 22 at their outer ends. An outwardly extending mounting flange 29 is provided along the lower edge of plate 25 to be used in attaching the side frame to the base. Thus, an outwardly opening recess 30 is provided by each side frame 24 with a space 31 between the side frames 24. The near side of the machine as seen in FIG. 1 is the duct side and the far side is the drive side.

The cover 21 includes a bottom channel 32 on opposite sides of base 22 with top channels 34 along the outer edges of each top flange 28 above channels 32. A side panel 35 is slidably carried between each of the opposed bottom and top channels 32 and 34 which has a forwardly projecting front edge 36 toward its upper end to close the recesses 30 in the sides of the machine. A top panel 38 is carried between the top channels 34 to close the upper forward portion of space 31. A back panel 39 is mounted on the rear flanges 26 to close the lower back portion of the space 31. A cassette cover 40 which has an inverted L-shape is carried between the top channels 34 to close both the upper rear portion of space 31 and upper back portion of space 31 as will become more apparent. A paper exit cover 41 as best seen in FIG. 1 is carried by the bottom channels 32 to cover the lower front portion of space 31 and is provided with a paper exit opening 42 as will become apparent. The side frames 24 are provided with aligned, forwardly opening cutouts 44 best seen in FIG. 3 as will become more apparent.

A control panel 45 is carried between the front flanges 26 of side frames 24 to close part of the front portion of space 31 immediately above cutouts 44 as best seen in FIGS. 1, 4. The upper edge of panel 45 is provided with an upwardly opening support channel 46, which, in combination with a downwardly opening channel 48 carried by the upper ends of front flanges 26, removably mount a substantially square viewing screen 49. The viewing screen 49 is of known construction as will become more apparent.

SUPPLY OF COPY PAPER

The supply of copy paper 12, as seen generally in FIGS. 2 and 4 and more specifically in FIGS. 6–11, includes generally a roll 50 of copy paper mounted in a cassette 51. The cassette 51 includes a housing 52, a support tube 54 rotatably mounted in the housing 52 and on which is carried the roll 50 of copy paper, and a brake 55 carried by housing 52 and operatively engaging the support tube 54 to retard its movement.

The housing 52 is made in two pieces, a main cylinder 56 and an end cap 58. The housing 52 is assembled with the roll 50 and support tube 54 therein and designed so that the housing 52 will be destroyed if disassembly is attempted to reload same. This makes the cassette 51 a single use item. The main cylinder 56 includes a tubular side wall 59 integral with a circular end wall 60 closing one end thereof. A paper exit slot 61 as seen in FIGS. 2 and 7 is defined along the wall 59 parallel to its centerline CL as will become more apparent. A centrally located annular bearing flange 62 is carried on the inside of end wall 60 and projects into the paper cavity defined by walls 59 and 60 with a beveled inner end (FIG. 6) as will become more apparent. One end of the support tube 54 is received over bearing flange 62 to be rotatably carried thereon. Support lugs 64 are provided on diametrically opposed sides of the outside of end wall 60 for mounting the cassette 51 as will become more apparent.

The opposite end of side wall 59 is beveled along its outside edge as indicated at 65 in FIGS. 7–10 for a prescribed distance and down the length of wall 59. A notch 66 is also provided in the end of side wall 59 as best seen in FIG. 7 to locate the end cap 58 as will be explained. A plurality of locks 68 project out from the beveled surface 65 on side wall 59, one of which is shown in detail in FIGS. 8–10. While three such locks 68 are provided for the embodiment illustrated, the number may be varied without departing from the scope of the invention. Each lock 68 is formed integral with the side wall 59 and defines an outwardly tapering surface 69 and a radially extending locking surface 70. The surface 69 defines an angle $\alpha$ (FIG. 8) with the centerline CL of main cylinder 56 and tapers inwardly toward the free end of side wall 59. The locking surface 70 is spaced from the end of wall 59 the distance a and is perpendicular to centerline CL. The inside of the free end of wall 59 directly under each of the locks 68 is undercut as indicated at 71 to provide a thinned portion 72 under each lock 68 of a prescribed thickness b at that point directly under the locking surface 70. This allows the locks 68 to deflect inwardly while the housing 52 is being assembled but fractures if disassembly is attempted as will become more apparent.

The end cap 58 closes the open end of the main cylinder 56. It includes a circular central plate 74 of approximately the same diameter as the end wall 60. An annular abutment 75 is provided around the circumference of plate 74 and projects over the outside surface 76 of the plate 74. The abutment 75 defines an annular groove 78 therein which opens on the inside surface 79 of plate 74. The groove 78 has a mean diameter equal to that of the side wall 59 of main cylinder 56 and has a width substantially equal to the thickness of side wall 59 so that the beveled end 65 of side wall 59 can be slidably received in groove 78 as will become more apparent. An annular support lip 80 integral with abutment 74 projects over the inside surface 79 of plate 74 with its inside surface forming a continuation of the outside edge of groove 78.

A plurality of retainers 81 (FIGS. 8–11) are provided on the inside surface of lip 80 which correspond in number and location to locks 68 on the main cylinder 56 and co-operate therewith to hold the cap 58 onto cylinder 56. Each retainer 81 includes an inwardly beveled leading surface 82 and a radially extending trailing surface 84 perpendicular to the centerline CL of cap 58 and cylinder 56. The surface 84 is spaced from the bottom of the groove 78 the distance A (FIG. 8) so that when the end of side wall 59 is fully seated in the groove 78, the surface 84 of retainer 81 engages the locking surface 70 of lock 68 to hold the cylinder 56 and cap 58 together as seen in FIG. 10. it will also be noted that the locks 68 and retainers 81 are located so that the projecting end 85 of side wall 59 has just entered the groove 78 when the tapering surface 69 of lock 68 first engages the beveled leading surface 82 of retainer 81 as best seen in FIG. 9. A reinforcing boss 86 is provided at each retainer 81 to strengthen the lip 80 thereat. A slot 88 is formed through booss 86, abutment 75, and partly through lip 80 as an incident to the molding operation when retainers 81 are formed. A locator 89 is formed across groove 78 which cooperates with the notch 66 to locate the retainers 81 in alignment with locks 68.

As the main cylinder 56 and end cap 58 are forced together, the tapering surface 69 of locks 68 and beveled surface 82 of retainers 81 create radially inwardly directed forces on the thinned portion 72 of side wall 59 causing the locks 68 to be deflected inwardly and allow the projecting end 85 inwardly side wall 59 to fully seat in groove 78 whereupon the resilience of side wall 59 causes the locks 68 to spring back into their initial position. At this point the locking surface 70 of lock 68 is engaged by the trailing surface 84 of retainer 81 to hold the end cap 58 in position. If disassembly is attempted, the surface 70 and 84 exert substantially longitudinally directed forces on side wall 59 causing the thinned portions 72 to break away with locks 68. This prevents reuse of main cylinder 56.

A centrally located bearing flange 90 is provided on the inside surface of plate 74 of cap 58 which has a cylindrical portion 91 corresponding in diameter to that of bearing flange 62 to rotatably mount the support tube 54 within housing 52 in conjunction with flange 62. The flange 90 also includes an inwardly tapering brake mounting wall 92 on the leading end of cylindrical portion 91. The wall 92 mounts the brake 55 therein through three cutouts 94 equally spaced about the wall 92 at its juncture with the cylindrical portion 91.

The brake 55 is a resilient member 95 formed from wire stock which has a convex arcuaTe central bearing portion 96 and a pair of convex arcuate side bearing portions 98 with each of the side bearing portions 98 being connected to the central bearing portion 96 through a concave arcuate camming portion 99 as best seen in FIG. 11. Camming prongs 100 are provided on those ends of the side bearing portions 98 opposite those ends connected to the central bearing portion 96 which face each other but are not connected. The side portions 98 can be forced toward each other through the spring action of the central portion 96 which urges the side portions 98 apart toward their normal positions as shown by dashed lines in FIG. 11. Thus, to insert the member 95 through the cutouts 94, the side portions 98 are forced toward each other, the central portion 96 inserted through one of the cutouts, and then the side portions 98 released so that they project through the other cutouts when the member 95 springs back. When the tube 54 is on the cylindrical portion 91 of flange 62, the outer tips of the portions 96 and 98 engage the inside thereof under the spring action of member 95. The sides 101 of the cutouts 94 prevents the member 95 from rotating as the tube 54 is rotated. This exerts a retarding force of tube 54 as it is rotated.

The tube 54 is illustrated as made of fiberboard, however, other materials may be used. The tube 54 is as long as the cavity in the housing 52 and is rotatably supported between the cylindrical portion of flange 90 and flange 62 concentrically within the side wall 59. The roll 50 is made up of layers of a single web 102 of copy paper wound around the tube 54 so that as the web 102 is unwound therefrom, the tube 54 is rotated therewith with a constant braking force exerted thereon by member 95.

Figure 5:
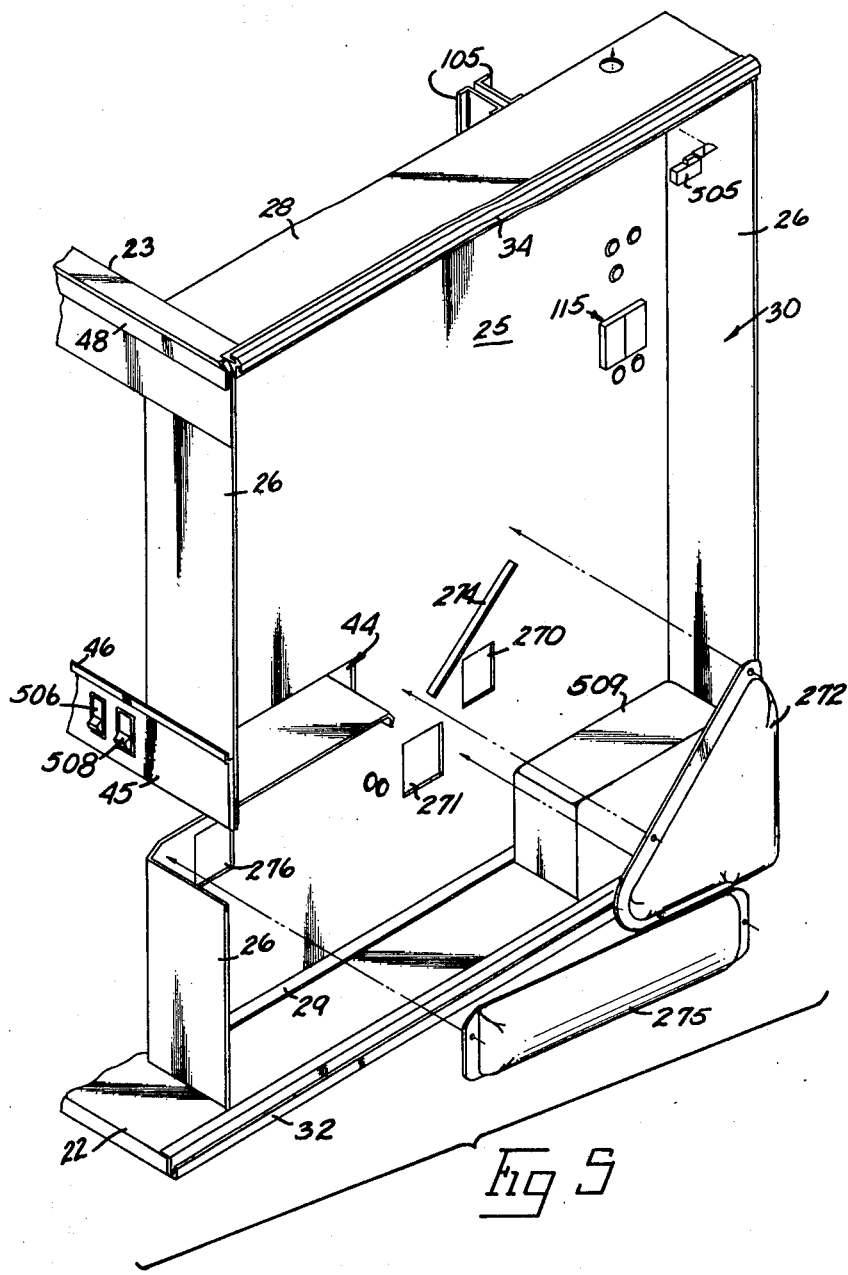
FIG. 5 is a partial exploded perspective view of the duct side of the machine with the side panel ommitted for clarity.

The cap 58 also includes a pair of mounting lugs 104 similar to lugs 64 on end wall 60 which are aligned with lugs 64. Mounting brackets 105 are provided on the inside of each support plate 25 of side frames 24. Brackets 105 as best seen in FIGS. 5 and 6 are provided with upwardly oriented channels 106 which are horizontally aligned across space 31 at the upper rear portion thereof. The lugs 64 and 104 are slidably received in channels 106 with the downward movement being arrested by abuttments 108. This locates the paper exit slot 61 in an upward rearwardly extending position as seen in FIG. 2.

While various materials may be used for making the main cylinder 56 and end cap 58 one satisfactory material is a medium impact polystyrene. This material is injections molded and has sufficient strength and elasticity to be assembled without being damaged, but insufficient strength and elasticity to be disassembled without fracture at the thinned portions 72 of side wall 59.

IMAGE FORMING MEANS

The image forming means 14 is mounted between the side frames 24 in space 31 as best seen in FIG. 4 and includes a light source assembly 110, a projection unit 111, a fixed mirror assembly 112, a movable mirror-shutter assembly 114, a charging unit 115 with a charging station 116, an exposure station 118, a developing unit 119 with a developing station 120, and a fan-pump assembly 121.

The light source assembly 110 is mounted in space 31 below the cutouts 44 in side frames 24 and is best seen in FIGS. 12 and 13. The assembly 110 includes an open top carriage box 125 having side walls 126, end wall 128 and a bottom wall 129. Mounting tabs 130 are provided on side walls 126 which project out over end walls 128 to engage notches 131 in the lower edge of each of the cutouts 44 to suspend the box 125 therebetween as seen in FIG. 4. An air inlet opening 132 is provided through one end wall 18 with an air directing vane 134 along one edge of opening 132 and projecting into the interior of box 125 as seen in FIG. 13. An exhaust opening 135 is defined through the front side wall 126 across the lower portion thereof and a downwardly inclined vane 136 is provided along the upper edge thereof and projects forwardly of box 125 to deflect the air flow exhausting from the box 125 downwardly as will be explained.

A light source undercarriage 140 is mounted on the bottom wall 128 of box 125 in the interior thereof. A lamp 141 is mounted between a pair of upstanding flanges 142 of undercarriage 140 in alignment with the air flow through inlet opening 132 as will be explained. A pair of condenser lens 144 are carried between upstanding resilient plates 145 of undercarriage 140 and, in conjunction with a reflector 146 also held between plates 145, direct the light from lamp 141 from a horizontal direction into a vertical direction. The lens 144 and reflector 146 are removably held between plates 145 by a spring 148 connecting the plates as best seen in FIG. 13.

The open top 149 of the box 125 is closed by a cover 150 as seen in FIGS. 12 and 13 which is held in place by catches 151 engaging flanges 152 along the upper edges of the side walls 126. A light exit opening 154 is provided through cover 150 to allow the light to pass from the assembly 110 after it passes through the condenser lens 144. The light thus exits the opening 154 along the upwardly directed leg $P_1$ of the light path P in the machine as best seen in FIG. 4.

Figure 14:
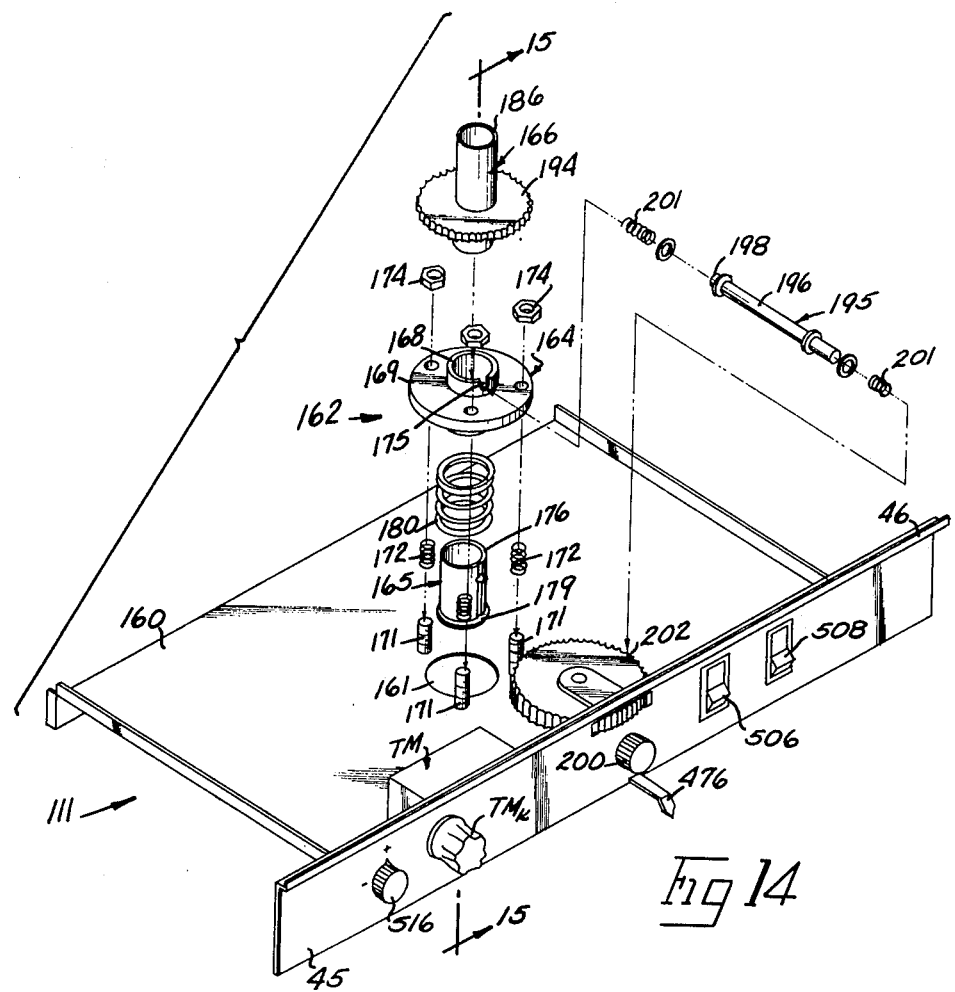
FIG. 14 is an exploded perspective view of the projection unit.
Figure 15:
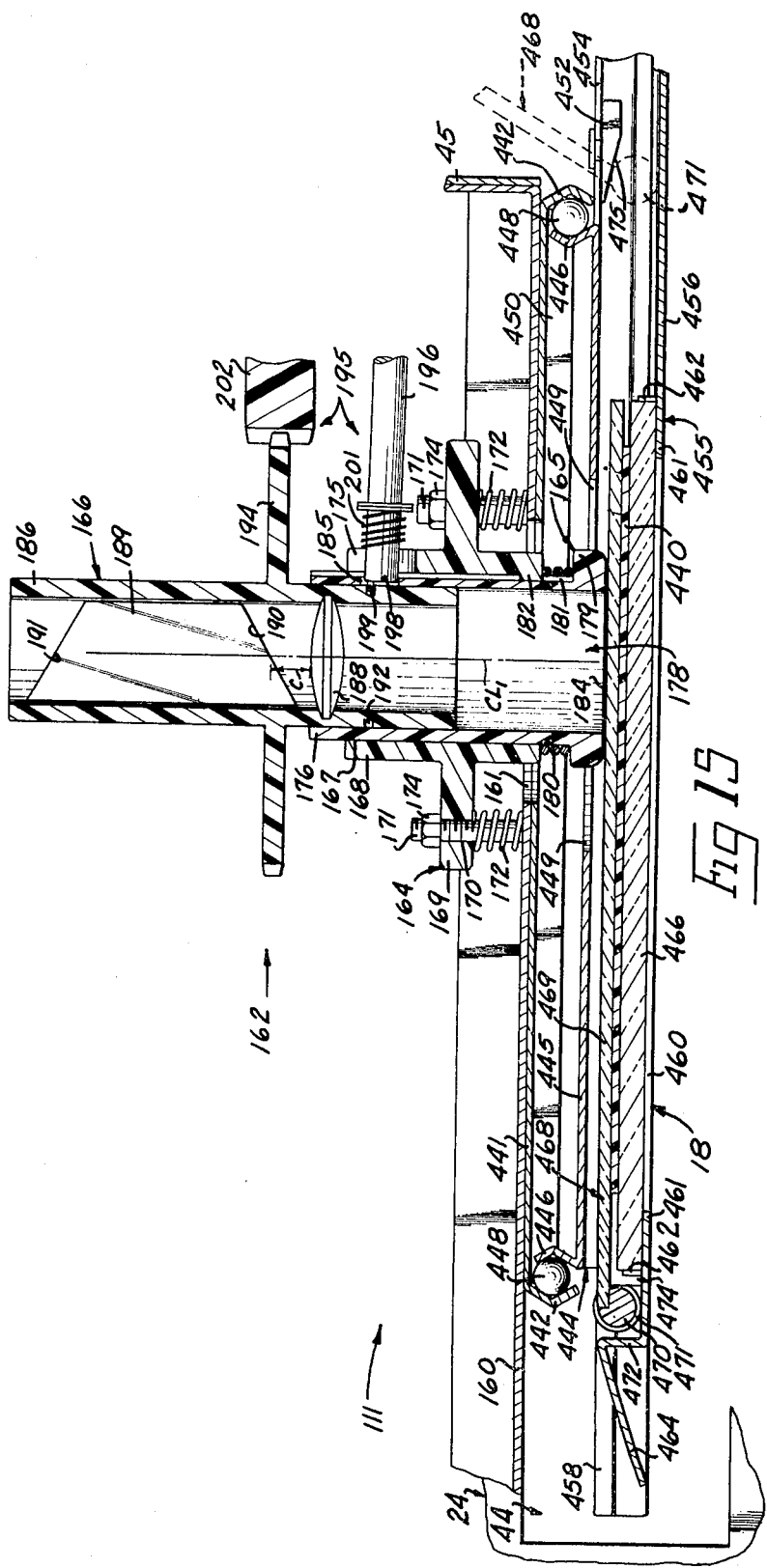
FIG. 15 is an enlarged cross-sectional view of the lens unit taken along line 15–15 in FIG. 14.

The projection unit 111 as best seen in FIGS. 4, 14, 15, includes a support platform 160 connected to the back of control panel 45 and flush with the upper edge of cutouts 44. A centrally located aperture 161 is provided through platform 160 and is located in vertical alignment with the opening 154 in the cover 150 of light source assembly 110 so that the light through opening 154 passes through the center of aperture 161. A focusing lens assembly 162 is provided at aperture 161 to focus the image transmitted in the light from assembly 110 as will be explained. The lens assembly 162 includes a lens tube holder 164 adjustably mounted on platform 160 about aperture 161, a lens adjustment tube 165 slidably mounted in the holder 164, and a lens unit 166 slidably and rotatably mounted in the tube 165.

The lens tube holder 164 includes a central cylinder 168 defining a central passage 167 therethrough with a mounting flange 169 intermediate the ends of cylinder 168. The centerline $CL_1$ of cylinder 168 is centered with respect to the aperture 161. The flange 169 has three equally spaced holes 170 therethrough which slidably receive a like number of threaded studs 171 therethrough. The studs 171 are carried by platform 160 about aperture 161 so as to locate the centerline $CL_1$ of cylinder 168 in alignment with the centerline of aperture 161. A compression coil spring 172 is received around each stud 171 between platform 160 and flange 169 and nuts 174 are threadedly received on studs 171 above flange 169. Thus, by tightening or loosening nuts 174, the angular position of centerline $CL_1$ can be varied with respect to the centerline of aperture 161 as will become more apparent. An upwardly opening slot 175 is provided in the upper portion of cylinder 168 that faces the front of the machine as will become apparent.

The lens adjustment tube 165 is slidably received in the central passage 167 of the cylinder 168 from the lower end thereof. The tube 165 includes a main cylindrical body 176 with a central passage 178. An abuttment flange 179 extends outwardly from the bottom end of tube 165. The body 176 is slidably received in passage 167 in cylinder 168 and a compression coil spring 180 is received around body 176 between the lower end of cylinder 168 and flange 179 on tube 165 to urge the tube 165 downwardly as will become more apparent. A longitudinally extending slot 181 is provided along the outside of body 176 which co-operates with a locator 182 inside cylinder 168 of holder 164 to fix the rotational position of tube 165 with respect to holder 164 while allowing tube 165 to slide in holder 164. The lower face 184 of tube 165 rests on the carrier assembly 18 as will be explained. A hole 185 is provided through the body 176 that lies in alignment with the slot 175 when the tube 165 is in position as will be explained.

The lens unit 166 is slidably and rotatably received in the upper end of adjustment tube 165. Unit 166 includes an elongate hollow cylinder 186 having an outside diameter just sufficient to be slidably and rotatably received in passage 178 through tube 165. A convex focusing lens 188 is mounted in the lower portion of cylinder 186 to focus the image transmitted by the light source assembly 110 as will become more apparent. A dove prism 189 is mounted in cylinder 186 above lens 188 with its longitudinal centerline aligned with the centerline of lens 188. The light entry face 190 of prism 189 is located from the lens 188 a mean distance $c$ as best seen in FIG. 15. The distance $c$ is such that the image from lens 188 just fits within the confines of the face 190. Because it was found that the image does not expand while it passes through prism 189, it is only necessary that the entry face 190 and exit face 191 be as large as the image received rather than several times larger as was previously thought.

A circumferentially extending groove 192 is provided around the outside of cylinder 186 which lies behind the hole 185 in tube 165 and slot 175 in holder 164 when the unit 166 is in position as will become more apparent. A toothed gear 194 is also provided around cylinder 186 for use in rotating the image as is known in the art by rotating the cylinder 186 along with prism 189.

A focusing drive mechanism 195 is provided to allow adjustment of the lens unit 166 from the control panel 45. The mechanism 195 includes a drive shaft 196 with its driving end rotatably carried in the hole 185 in adjustment tube 165 and its driven end rotatably carried through an appropriate aperture in the control panel 45. The driving end 198 of shaft 196 rests against the outside of cylinder 186 and a drive pin 199 carried by shaft 196 at the outside edge of end 198 is slidably received in groove 192 so that the unit 166 will be raised and lowered as the shaft 196 is rotated to focus the image. A focusing knob 200 is affixed to the driven end of shaft 196 protruding through the control panel 45 for the operator to selectively rotate shaft 196. Springs 201 maintain shaft 196 in position. A driving gear 202 rotatably mounted on the back of panel 45, meshes with gear 194 and protrudes through panel 45 so that the unit 166 can be rotated by the operator from the front of control panel 45.

The fixed mirror assembly 112 is mounted in the upper forward position of space 31 on cross brace 23 as seen in FIGS. 2 and 4. The assembly 112 intersects the path $P$ at the upper end of leg $P_1$ thereof and reflects the image from the projections unit 111 downwardly and rearwardly along the leg $P_2$ of path $P$. Assembly 112 includes a mirror 205 mounted on backing 206. The backing 206 has three studs 208 thereon which extend from the back thereof in spaced apart positions through holes in cross brace 23. A coil spring 210 is placed around each stud 208 between cross brace 23 and backing 206 and nuts 211 engage the ends of studs 206 protruding through cross brace 23 to locate the reflecting plane of the mirror 205. Thus, the mirror can be adjusted through nuts 211 to reflect the image along the legs $P_1$ of path $P$ at a desired angle.

The movable mirror-shutter assembly 114 is pivotally mounted centrally within space 31 between side frames 24 as seen in FIGS. 4 and 33. Assembly 114 serves to selectively reflect the image as it is directed along the leg $P_2$ of path $P$ along the viewing leg $P_3$ of path $P$ and onto the viewing screen 49 for viewing or to allow the image to continue along leg $P_2$ to the exposure station 118 as seen in the dashed line in FIG. 4 as will become apparent.

The assembly 114 includes a pivot shaft 220 pivotally mounted between the support plates 25 of side frames 24. A pair of spaced apart driving links 221 are attached to opposite ends of shaft 220 between side frames 24 and extend forwardly and downwardly therefrom for rotation with shaft 220. A reflector assembly 222 is mounted between the projecting ends of links 221 at the lower portion thereof. A positioning link 224 is pivoted intermediate its ends to each link 221 intermediate its ends. One of the ends of each of links 224 is pivoted to the upper end of reflector assembly 222 and the other of the ends of each link 224 pivoted to one end of a secondary arm 225. The arms 225 are directed generally rearwardly and are pivoted to the side frames 24 on opposite sides of space 31.

The reflector assembly 222 includes a support 226 with a forwardly facing bed 228, a downwardly and forwardly facing shutter flange 229 along the bottom edge of bed 228, and a pair of rearwardly facing side angles 230 along opposite side edges of bed 228. A reflector 231 of known construction is mounted on the forward surface of bed 228 to reflect the image along the leg $P_3$ of path $P$ onto the back of the viewing screen 49 when assembly 114 is in viewing position as shown by solid lines in FIG. 4. Also, sealing strips 232 may be provided along the forward edges of the assembly 222 to block the light through screen 49 when the assembly 114 is in its print position as shown by dashed lines in FIG. 4. The links 224 are pivoted to angles 230 at their upper end while the driving links are slidably and pivotally connected to the lower ends of angles 230 through slip joints 234.

Viewing abuttments 235 are provided on the support plates 25 of the frames 24 that engage the underside of the ends of positioning links 224 adjacent their connection with arms 225 to locate the assembly 114 in the viewing position. Print abuttments 236 are provided on plates 25 of the side frames 24 to engage the top of the projecting ends of driving links 221 and locate the assembly 114 in its printing position.

A driving arm 238 is provided on one end of pivot shaft 220 protruding through the plate 25 and extends generally downward therefrom within the drive recess 30 in side frame 24 as best seen in FIG. 3. The arm 238 is shown in its viewing position in FIG. 3 in solid lines and in its printing position in phantom lines. Thus, as the lower end of arm 238 is pivoted forwardly in a counterclockwise direction in FIG. 3, the reflector assembly 222 will be moved forwardly and upwardly while its top is pivoted forwardly to its printing position and, as the arm 238 is pivoted rearwardly or clockwise in FIG. 3, the assembly 222 will be moved rearwardly and downwardly while its top is pivoted rearwardly to its viewing position. It will also be noted that since the center of gravity of assembly 222 is always forward to the pivot axis of shaft 220, the weight of the assembly 222 urges the assembly 114 toward its viewing position.

The lower end of arm 238 is received in a guide 239 mounted on the outside of plate 25 within recess 30 as seen in FIGS. 3 and 35. A resilient detent 240 is provided at the forward end of guide 239 to maintain the arm 238 and assembly 222 in their viewing position as will become more apparent.

The charging means 115 is positioned at the rear of the space 31 across the path P' of travel of the web 102 of copy paper as it moves from cassette 51 to the exposure station 118 as seen in FIGS. 3 and 4. The unit 115 includes a pair of corona units 245 and 246 mounted between plates 25 of side frames 24 with an opening 248 therebetween through which the web 102 of copy paper passes to be electrostatically charged. The units 245 and 246 are wire type coronas of known construction as will become apparent.

The developing unit 119 is positioned in the lower forward portion of space 31 and is slidably supported by the base 22 of cabinet 11 as seen in FIG. 4. The unit 119 applies toner particles to the copy paper after the electrostatic latent image has been formed to develop the image into a visual image. Unit 119 includes a liquid toner reservoir 250, a paper submerging tray 251 which is filled with toner from reservoir 250 and through which the exposed copy paper passes to be submerged in the liquid toner for development, and an intensifier plate 252 which guides the paper through the toner and enhances the quality of the reproduced image as is known in the art.

The fan-pump assembly 121 is mounted on the developing unit 119 and drives the developing unit as well as creates a partial vacuum at the exposure station 118 while supplying cooling air to the light source assembly 110 and heated air to the developed copy paper. The assembly 121 includes a secondary drive motor 260 mounted on top of reservoir 250 with a drive shaft 251 extending both into the reservoir 250 and above motor 260. A toner pump 262 of known construction is suspended in reservoir 250 and drivingly connected to that end of shaft 261 extending into the reservoir to pump the toner from reservoir 250 into tray 251. Overflow holes 254 are provided in tray 251 to allow the excess toner to flow back into the reservoir 250.

Figure 16:
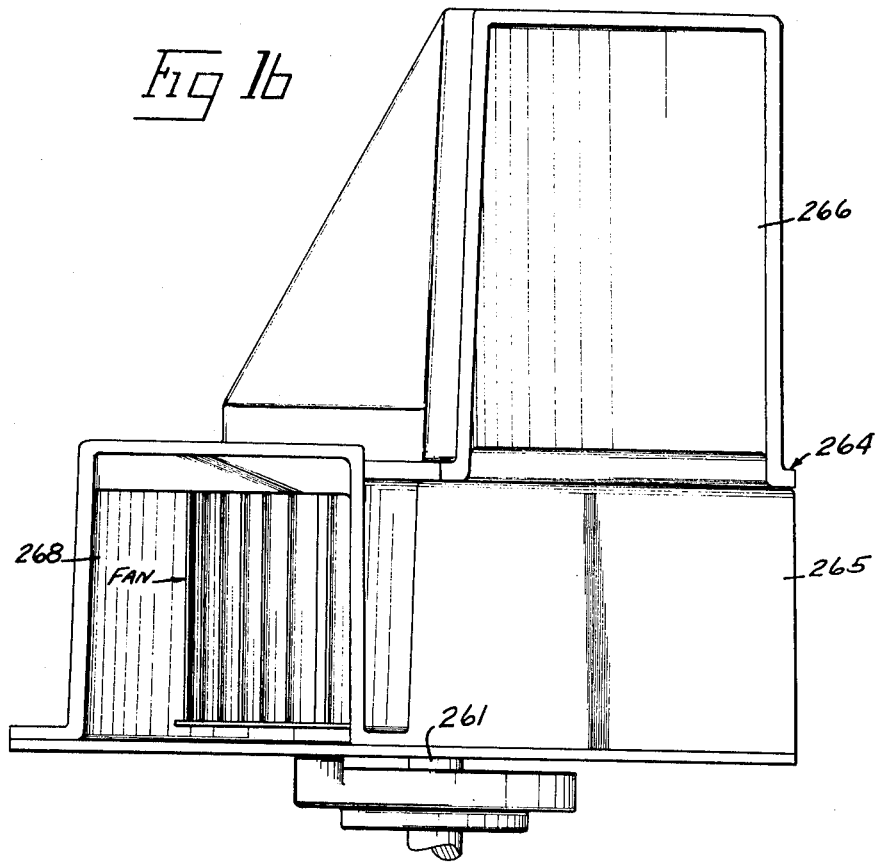
FIG. 16 is an enlarged elevational view of the fan unit showing the inlet and outlet thereof.

A fan unit 264 is mounted on reservoir 250 over motor 260 and operatively connected to the upper end of shaft 261. The unit 264 of the centrifugal fan type with a housing 265 having an inlet 266 and an outlet 268 as seen in FIG. 16. Both the inlet 266 and outlet 268 face the central plate 25 of the duct side frame 24 and are in a sealing relationship therewith when unit 119 is in position as seen in FIG. 4.

An inlet port 270 (FIG. 5) is provided through plate 25 in alignment with the inlet 266 of fan unit 264 and an outlet port 271 (FIG. 5) is provided through plate 25 in alignment with outlet 268 of fan unit 264.

An intake duct 272 (FIG. 5) on the outside of plate 25 within duct recess 30 connects inlet port 270 to a vacuum port 274 through plate 25 at the exposure station 118 as will be explained. An exhaust duct 275 (FIG. 5) on the outside of plate 25 in recess 30 connects the outlet port 271 to a cooling port 276 through plate 25 at the forward portion thereof. Cooling port 276 is aligned with the opening 132 in the end wall of light source assembly 110 (FIG. 13) so that the cool air exhausted from the fan unit 264 passes over the lamp 141, lens 144, and reflector 146 to cool same while the air is heated. The heated air then passes through exhaust opening 135 and is deflected downwardly by vane 136 across the exit path P' of the developed copy paper as will become apparent to dry same.

CONVEYOR MEANS

The conveyor means 15 includes a guide roll 280, a paper feed roll assembly 281, a vacuum exposure assembly 282, and a squeegee discharge roll assembly 284 that move the web 102 of copy paper from the cassette 51 along the path P' down through the charging station 116, exposure station 118, developing station 120 and out of the paper exit slot 42 in the front of the machine 10 as best seen in FIG. 4.

The guide roll 280 is freely rotatably mounted between the upper rear corners of plates 25 of side frames 24 behind the paper cassette 51. The web 102 of copy paper passes over the roll 280 and then downwardly to be drivingly engaged by the paper feed roll assembly 281. The assembly 281 is located above the charging unit 115 at the rear end of the machine and includes a pair of rolls 285 of known construction spring biased together and rotatably mounted between the plates 25 of side frames 24. The rolls 285 are driven as will be explained so as to drive the web 102 downwardly through the cutter means 16 as will be explained while unrolling the web 102 from roll 50 against the braking action of brake 55. After the web 102 passes through cutter means 16, it passes through the opening 248 between corona units 245 and 246 and then onto the exposure assembly 284.

Assembly 284 includes a support pan 286 mounted between plates 25 of side frames 24 and extends from a position just below the charging unit 115 forwardly and downwardly to a position just rearwardly of the paper submerging tray 251. Driving rolls 288 are positioned across the upper and lower ends of pan 186 to mount a vacuum exposure belt 289 therearound with an upper flight 290 passing over and supported by pan 286 and a lower flight 291 passing over pan 286. As the rolls 288 are synchronously rotated, the upper flight 290 of belt 289 will be moved downwardly across pan 286.

The pan 286 is hollow with a vacuum chamber 292 therein which communicates with the vacuum port 274 through plate 25 of side frame 24 so that a partial vacuum will be drawn in pan 286 when the fan unit 264 is operating. The top wall 294 of pan 286 is slotted at 295 to allow air to be drawn therethrough as is known in the art and apertures 296 are provided through belt 298 in known manner. This causes the partial vacuum to hold the copy paper deposited on belt 289 thereon as the upper flight 290 of belt 289 moves the paper through the exposure station 118 so that it is oriented perpendicular to the image path P.

A backup roll 298 is rotatably mounted between side frames 24 in driving contact across the upper end of upper flight 290 of belt 289 so as to insure positive placement of the copy paper on the belt 289. A separator roll 299 is rotatably mounted between side frames 24 in driving contact with the lower end of upper flight 290 of belt 289 to insure separation of the exposed copy paper from belt 289 and to drive the paper through the submerging tray 251 into contact with squeegee discharge roll assembly 284.

The assembly 284 includes a pair of squeegee rolls 300 of known construction which squeeze the excess toner from the developed copy paper and discharge the paper through slot 42 as the rolls are driven as will be explained.

CUTTER MEANS

As noted above, the cutter means 16 is positioned across the path P' of paper travel between the feed roll assembly 281 and charging unit 115 to cut the web 102 when a prescribed length of the web has been fed by the rolls 285 as illustrated in FIGS. 3, 4, and 17–20. The cutter means includes a knife assembly 305 having a stationary blade 306 and a rotary blade 308. Blade 306 has a rectangular cross section with a forward face 309 and a cutting edge 310 at the lower forward corner thereof. The blade 306 is angled upwardly at its forward end as seen in FIG. 20 generally horizontally extending between mounting brackets 311 attached to the plates 25 of side frames 24. The rotary blade 308 is rotatably mounted in brackets 311 in an operative relationship with stationary blade 36. The blade 308 is a cylinder with a portion thereof removed to form a cutting edge 312 as is known in the art with circular abuttments at opposite ends thereof. The blade 308 is rotatably journalled in slots 314 through brackets 311 and a leaf spring 315 is positioned under the stub shafts 316 of knife 308 and held by detents 318 on brackets 311 to constantly urge the abuttments on blade 308 against the edge 310 on blade 306. Thus, it will be seen that when the cutting edge 312 of rotary blade 308 is rotated past the cutting edge 310 of stationary blade 306, the web 102 of paper passing between blades 306 and 308 will be cut as is known in the art. Guides 319 are carried between brackets 311 below blades 306 and 308 to guide the paper into the opening 248 between corona units 245 and 246.

Figure 18:
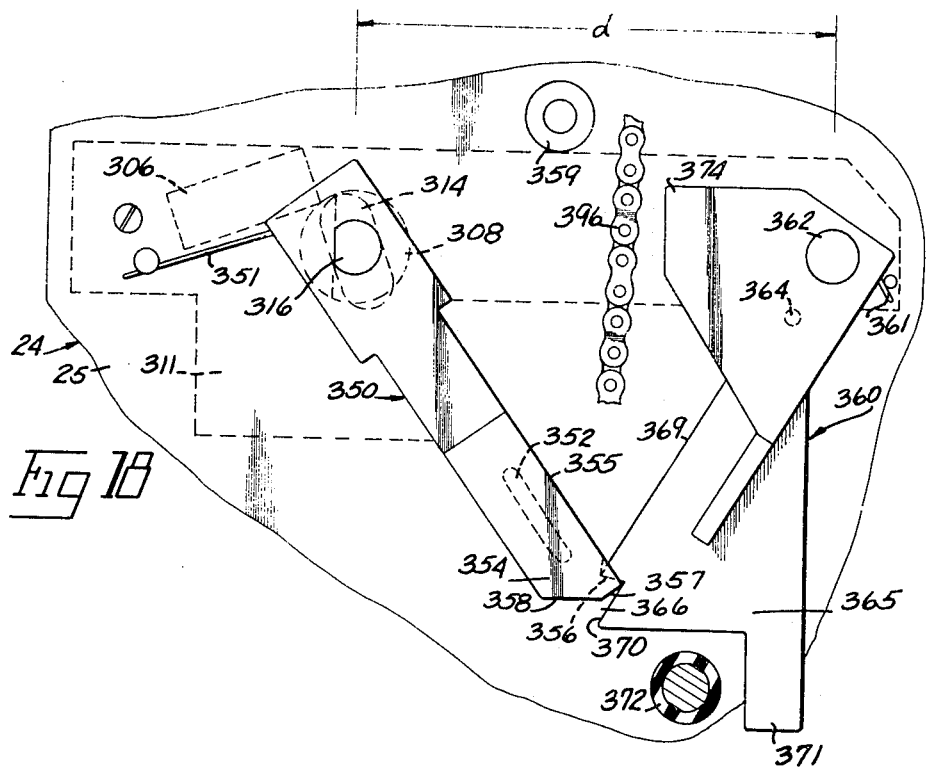
FIG. 18 is an enlarged elevational view of the cutter drive means in the cocked position.
Figure 17:
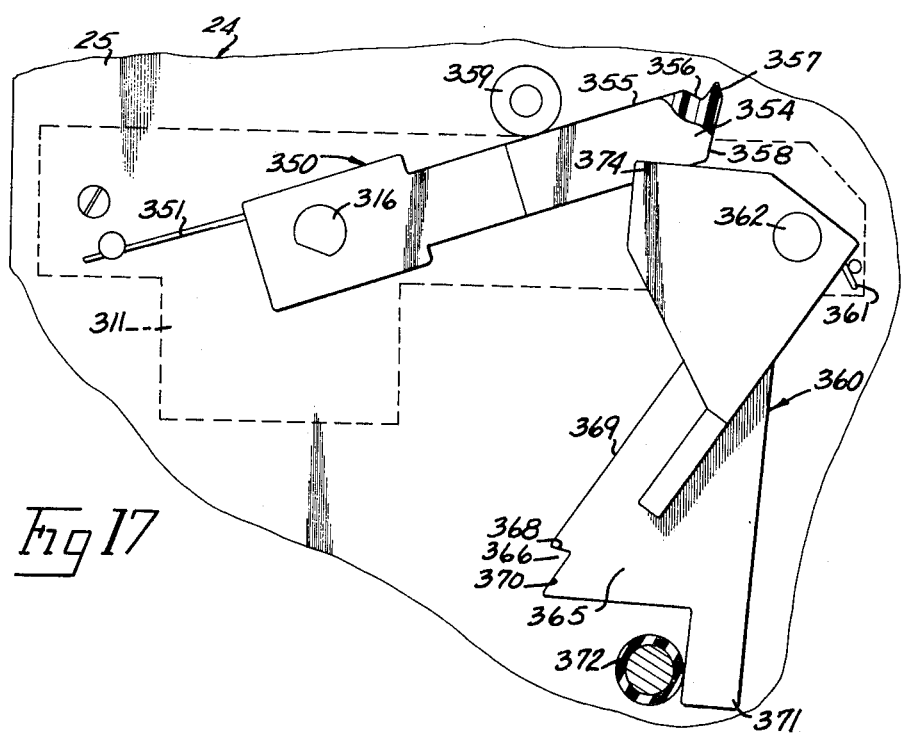
FIG. 17 is an enlarged elevational view of the cutter drive means in the released position.

A driving arm 350 is affixed to the end of the stub shaft 316 extending through an opening in that plate 25 of drive side frame 24 as seen in FIGS. 17 and 18. The arm 350 is located adjacent the outside of plate 25 and within recess 30. The arm 350 is used to rotate the rotary blade 308 to cut the web 102 of copy paper. The arm 350 is urged in a counterclockwise direction as seen in FIGS. 2 and 17 by a torsion spring 351 positioned arond stub shaft 316 with one end held by the plate 25 of side frame 24 and the other end connected to arm 350 through a slot 352. The projecting end 354 of arm 350 is provided with a camming surface 355 on the outside thereof that is used to rotate the arm 350 clockwise as will be explained. The inside of the end 354 of arm 350 defines a check notch 356 that opens upwardly for use in holding the arm 350 in a cocked position as shown in FIG. 18 and described below. The lower portion of end 354 is beveled to provide a driving surface 358 as will become apparent. The counterclockwise movement of arm 350 is limited by a bumper 359 as seen in FIG. 17 as will become apparent.

A latch 360 is pivoted on plate 25 of side frame 24 a prescribed distance d forwardly of drive arm 35 and co-operates therewith to control the position of arm 350. The latch 360 is urged in a clockwise direction by a torsion spring 361 as best seen in FIG. 19 which is carried around the pivot shaft 362 of latch 360 with one of its ends connected to plate 25 and its other connected to latch 360 through hole 364. The projecting end 365 of latch 360 is provided with a cutout 366 to provide a check shoulder 368 registerable with notch 356 to maintain the arm 350 in its cocked position as shown in FIG. 18. The rearwardly facing edge 369 of latch 360 provides a camming surface lying in the plane of the projecting end 354 and notch 356 of arm 350 so that as the arm 350 is rotated in a clockwise direction as seen in FIG. 17 and further explained below, the beveled surface 358 of arm 350 will engage the edge 369 of latch 360 and rotate it in a counterclockwise direction sufficiently to allow the shoulder 368 to engage notch 356 in arm 350 to maintain the arm 350 in its cocked position. The cutout 366 also provides a limiting surface 370 which engages the tip 357 of arm 350 as the tip 357 passes over shoulder 368 to maintain the shoulder in alignment with notch 356. Thus, when the arm 350 is released to be rotated in its counterclockwise direction, the shoulder 368 of latch 360 will engage the notch 356 of arm 350 to hold the arm 350 in its cocked position as shown in FIG. 18.

A striker 371 is provided on the lower forward portion of the projecting end 365 of latch 360 to engage an abuttment 372 as will be explained to limit the clockwise movement of latch 360 under the influence of spring 361 so that when the latch is released, the edge 369 is in alignment with the beveled surface 358 of arm 350 so that the arm can be recocked.

For releasing the shoulder 368 from notch 356, a trip 374 is provided on the upper end of latch 360 and displaced forwardly of the end 365 of latch 360. When the trip 374 is moved downwardly as will be explained, the latch 360 will be rotated counterclockwise against the force of spring 361 to release arm 350.

The cutting edge 312 of rotary blade 308 is oriented with respect to arm 350 so that when the arm 350 is in its cocked position shown in FIG. 18, the blade 308 is oriented as shown by solid lines in FIG. 20 so that sufficient clearance is provided between cutting edges 310 and 312 for the web 102 of copy paper to pass therebetween. When the arm 350 is released from its cocked position (FIG. 18) and is moved toward the bumper 359 (FIG. 19), the cutting edge 312 of rotary blade 308 is moved past the cutting edge 310 of stationary blade 306 as seen by dashed lines in FIG. 20 as the arm 350 is rotated counterclockwise as seen in FIGS. 18 and 19 by spring 351 so that the web 102 will be cut as will become more apparent.

DRIVE AND CONTROL MEANS

The drive and control means 19 is mounted in recess 30 of side frame 24 on the drive side of the machine as best seen in FIGS. 3 and 21–25. The means 19 includes a flexible endless transfer member 375 mounted about and engaging a series of sprockets for movement along a prescribed path P'' shown in FIGS. 4 and 21 and lying in a vertical plane PL within recess 30 shown in FIG. 22 and spaced a predetermined distance $d_1$ from plate 25 of side frame 24 as will become more apparent. A main drive motor 378 is mounted on plate 25 within space 31 below the upper rear portion of the exposure assembly 284 with its drive shaft 379 protruding outwardly through plate 25 into drive recess 30. A main drive sprocket 380 is pinned to the end of drive shaft 379 with its teeth lying withinn the plane PL. An upper driven sprocket 381 is pinned to the end of the support shaft of the drive roll 288 at the upper rear end of assembly 282 with its teeth also lying in plane PL. An idler sprocket 382 is rotatably journalled on the support shaft of the rearmost paper feed roll 285 with its teeth lying within the plane PL so that sprocket 382 rotates independently of roll 285 as seen in FIG. 24. A driven sprocket 384 is also mounted on the end of the support shaft of roll 285 outboard of sprocket 382 but is pinned thereto so as to cause rolls 285 to rotate as it is rotated. The teeth of sprocket 384 lie in a plane $PL_1$ outboard of plane PL by a distance $d_2$ as best seen in FIG. 24. An upper idler sprocket 385 is rotatably mounted on plate 25 forwardly of sprocket 382 with its teeth lying in plane PL as seen in FIG. 3. A backup sprocket 386 is rotatably mounted on plate 25 through abuttment 372 below sprocket 285 with its teeth lying in plane PL. A corner sprocket 388 is rotatably mounted on plate 25 below sprocket 386 and adjacent the main drive sprocket 380 with its teeth lying in plane PL. A backup sprocket 389 is rotatably mounted on plate 25 just below the rear edge of the cutout 44 in plate 25 with its teeth in plane PL. A dual backup sprocket 390 is rotatably mounted on plate 25 below cutout 44 and just rearwardly of the discharge roll assembly 284. The lower squeegee roll 300 has its support shaft pinned to a driven sprocket 391 with its teeth in plane PL. A backup sprocket 392 is rotatably mounted on plate 25 below cutout 44 and sprockets 389 and 390 and just forward of the lower front end of exposure assembly 282. A drive sprocket 394 is pinned to the support shaft of the lower belt drive roll 288 of assembly 282 with its teeth lying in the plane PL. A takup sprocket 395 is rotatably mounted on plate 25 between the main drive sprocket 380 and the driven sprocket 381 with its teeth in plane PL.

The flexible transfer member 375 includes a main drive endless link chain 396 which passes around the sprockets lying in plane PL. Starting at point A at the main drive sprocket 380, it will be seen that chain 396 passes partly around the lower back portion of sprocket 380; then upwardly around the front of sprocket 395, then upwardly around the back of sprocket 381 and the upper back of sprocket 382; then forwardly around the upper front of sprocket 385; then downwardly along the back of sprocket 386 and around the lower back of sprocket 388, then forwardly and slightly downwardly over the tops of sprockets 389 and 390; then around the front of sprocket 391; then rearwardly and upwardly under the bottom of sprocket 390 and over the top of sprocket 392; then downwardly under sprocket 394; and finally upwardly and rearwardly back to point A at main drive sprocket 380.

As the motor 378 rotates its drive shaft 379 in a clockwise direction, the main drive chain 396 will be moved in the direction of the arrows in FIG. 3 thereby rotating the sprockets 381, 382, 385, 386, 388–392, 394 and 395. This causes the upper flight 290 of exposure belt 289 to be moved in the direction indicated in FIG. 4 and the squeegee rolls 300 to be rotated to drive copy paper out of slot 42.

For driving sprocket 384 and paper feed rolls 285, transfer member 375 includes a secondary link chain 398 mounted on and movable with the main drive chain 396. The secondary chain has a length considerably shorter than chain 396 as seen in FIG. 21 and is mounted on the outside thereof so that chain 398 moves along a path parallel to the path of the main chain 396 lying in the plane $PL_1$ of the teeth of sprocket 384 as seen in FIG. 24. The chain 398 extends between points B and C on main drive chain 396 so that when that portion of main drive chain 396 between points B and C passes over idler sprocket 382, the secondary chain 398 will drivingly engage the sprocket 384 to rotate it and paper feed rolls 285 to feed the web 102 of copy paper as will be more fully explained.

A control system 400 is also carried by main drive chain 396 as best seen in FIGS. 3 and 22 for controlling the electrical operation of the machine, the operation of cutter means 16, and the position of the shutter-mirror assembly 114. System 400 includes a cycle stop cam 401 mounted on the back links 402 of chain 396 as seen in FIG. 22 which extends on the outside of the chain at point D to move along with chain 396 on a path $p_1$ behind the plane PL and parallel thereto. System 400 also includes a registration cam 404 mounted on the back links 402 of chain 396 which extends inside the chain at point E to move along with chain 396 on a path $p_2$ behind the plane PL and parallel thereto.

System 400 further includes a coking and drive pin 405 mounted on chain 396 at point F. It is carried by the back links 402 and extends behind chain 396 to be moved therewith along path $p_3$ behind and parallel to plane PL. The pint 405 serves both to cock the cutter means 16 and to drive the shutter-mirror assembly 114 from its viewing to printing position and back again during each printing cycle as will be explained. The pin 405 includes a disk shaped retainer 406 as seen in FIG. 22 which maintains contact with the driving arm 238 of the mirror-shutter assembly 114 as will be further explained.

Also included in system 400 is a trip cam 408 mounted on chain 396 at point A. Cam 408 is carried by the front links 409 of chain 396 as seen in FIG. 22 and extends outwardly of chain 396 to be moved therewith along path $p_4$ parallel to and in front of plane PL. Trip cam 408 engages the trip 374 of latch 360 to release the driving arm 350 and allow same to rotate blade 308 and cut web 102 as will be explained.

From the foregoing, it will be seen that paths $p_1$–$p_4$ never intersect so that each of the cams 401, 404 and 408 as well as pin 405 can be used to operate different components independently of each other.

System 400 further includes a cycle stop switch 410 in tandem with a light switch 411 positioned adjacent chain 396 at point G on side frame 24. Switches 410 and 411 have a common actuator arm 412 which overlies only path $P_1$ as seen in FIG. 22 so that cam 401 transfers both switch 410 and switch 411 when point D on chain 396 reaches point G on side frame 24. This causes the cycle to stop while at the same time causing lamp 141 to be illuminated as will be further explained. Thus, the chain 396 is always stopped at the same position at the completion of each cycle. A registration switch 414 is mounted adjacent chain 396 at point H on side frame 24. The actuator arm 415 of switch 414 overlies path $P_2$ as seen in FIG. 22 so that cam 404 on chain 396 transfers arm 415 when point E on chain 396 reaches point H. This energizes the exposure timing circuit as will be explained.

A drive bracket 420 is provided on the lower portion of driving arm 238 of assembly 114 lying behind the chain 396 between sprockets 388 and 389 and between sprockets 380 and 394 as seen in FIGS. 3 and 33. Bracket 420 includes a pair of upper flanges 421 and 422 facing chain 396 with flange 421 being the front flange and flange 422 being the rear flange. Each of flanges 421 and 422 include an inwardly facing lip 424 as seen in FIG. 34 so that a reduced width slot 425 is provided therebetween with a larger width channel 426 behind lips 424 and between flanges 421 and 422. The flange 421 is shifted upwardly along arm 238 with respect to flange 422 so that rearwardly facing entrance space 428 is provided above the upper end of flange 422 and a forwardly facing exit space 429 is provided below the lower end of flange 421. When arm 238 is pivoted to its rearmost position with the reflector assembly 222 at its viewing position, the entrance space 428 is aligned with path $P_3$ of drive pin 405 so that as point F on chain 396 moves past arm 238, the pin 405 will pass over flange 422 and into channel 426 to engage the lip 424 of flange 421 to drive the arm 238 forwardly therewith. Because the chain 396 is moving forwardly and downwardly carrying pin 405 therewith and because the bracket 420 moves along an arcuate path as arm 238 is pivoted, the relative movement between pin 405 and bracket 420 causes the pin 405 to pass down through slot 425 as arm 238 is driven forwardly to the print position while the retainer moves down through channel 426. Thus, lips 424 keep the pin 405 in engagement with flanges 421 and 422 to insure the pivoting of the arm 238 and reflector assembly 222 forwardly to the print position. As arm 238 reaches its print position, its lower end passes detent 240 which holds it in print position. At this time, the exit space 429 has become aligned with path $P_3$ so that pin 405 can pass out from between flanges 421 and 422 leaving arm 238 in print position. If the forwardmost position of arm 238 is reached before exit space 429 has become fully aligned with path $P_3$, it will be seen in FIG. 3 that chain 396 can flex downwardly since slot 425 is angled in forward direction to allow pin 405 to flex downwardly is controlled by the position of backup sprocket 389 which is adjustable in known manner. This insures positive positioning of arm 238 forwardly of detent 240.

Bracket 420 also includes a pair of lower flanges 430 and 431 spaced below flanges 421 and 422 and facing chain 396 as seen in FIGS. 33 and 35. Flange 430 is the front flange and flange 431 is the back flange. Each of flanges 430 and 431 include an inwardly facing lip 432 which together define a slot 434 and channel 435 similar to that of flanges 421 and 422. The flange 430 is shifted upwardly along arm 238 with respect to flange 431 to provide a forwardly opening entrance space 436 below flange 430 and a rearwardly opening exit space 438 above flange 431. As point F on chain 396 passes rearwardly along the lower flight thereof between sprockets 394 and 380, the pin 405 enters channel 435 and passes upwardly along slot 434 to drive the arm 238 rearwardly out of engagement with detent 240 and back to its viewing position where pin 405 passes out through exit space 438.

The drive arm 350 of cutter means 16 is also positioned behind chain 396 so that the camming surface 355 overlies path $P_3$ when arm 350 is in its released position as seen in FIG. 17. When point F on chain 396 reaches the arm 350 in its released position, drive pin 405 engages the camming surface 355 and drives arm 350 down and clockwise as seen in FIG. 17. This causes the driving surface 358 on arm 350 to engage edge 369 of latch 360 and drive latch 360 counterclockwise to allow tip 357 to pass over shoulder 368 and engage surface 370 to locate shoulder 368 over notch 356. Camming surface 355 is dimensioned so that pin 405 releases it after tip 357 of arm 350 engages limiting surface 370 of latch 360. This leaves the shoulder 368 of latch 360 engaging notch 356 in arm 350 to hold arm 350 in its cocked position against spring 351 as seen in FIG. 18.

Trip 374 of latch 360 is located over the path $P_{44}$ of trip cam 408 when latch 360 is in its latching position holding arm 350 in its cocked position. When point A on chain 396 passes trip 374, the trip cam 408 engages trip 374 driving it downwardly and rotating latch 360 counterclockwise. This releases arm 350 to allow spring 351 to drive arm 350 upwardly in a counterclockwise direction to cause cutting edge 312 of rotary blade 308 to pass in a cutting relationship with cutting edge 310 on stationary blade 306 as shown by dashed lines in FIG. 20.

CARRIER ASSEMBLY

The carrier assembly 18 is mounted within cutouts 44 of side frames 24 as seen in FIGS. 1, 3, 4, 15 and 25 and is designed to position a microfiche 440 across the light path P between the light source assembly 110 and projection assembly 111 so that the visual image on the microfiche will be projected on the viewing screen 49 or the copy paper at exposure station 118. Assembly 18 is mounted under platform 160 of the projection unit 111 on a transversely extending race 441 attached to the underside of platform 160. Race 441 includes a pair of spaced apart depending race flanges 442 extending across space 31 transversely of the machine. A central opening is provided through race 441 in alignment with opening 161 in platform 160 to allow the light to pass therethrough.

Assembly 18 includes an undercarriage 444 mounted between race flanges 442 for movement back and forth transversely of the machine. Undercarriage 444 includes a central web 445 generally rectangular in shape with upstanding race flanges 446 along the front and rear edges thereof which co-operate with depending race flanges 442 to movably mount undercarriage 444 on ball bearings 448 between flanges 442 and 446. Thus, undercarriage 444 is easily movable transversely of the machine. A generally rectangular opening 449 is provided through web 445 to allow light to pass therethrough as will become more apparent. The sidewise movement of undercarriage 444 is limited by stops 450 attached to opposite ends of race 441 as best seen in FIG. 15.

A pair of outwardly facing race flanges 451 depend from opposite sides of web 445 starting at the back of the web and extending forwardly of the front of the web longitudinally of the machine. A pair of pivot cams 452 are carried by inwardly turned ledges 452 on flanges 451 in the vicinity of the front of web 445 as will be explained.

A fiche carrier 455 is mounted on undercarriage 444 for lateral movement therewith and longitudinal movement with respect thereto and to the machine as seen in FIG. 25. Carrier 455 includes a generally rectangular web 456 having inwardly facing upstanding race flanges 458 which co-operate with flanges 451 to movably mount carrier 455 on undercarriage 444 through ball bearings 459 between flanges 451 and 458. An opening 460 is provided across the rear portion of web 456 selectively alignable with opening 449 in undercarriage 444 to allow light to pass therethrough. Inwardly extending support lips 461 are provided around opening 460 as well as upstanding locating tabs 462 also as will become apparent.

A camming flange 464 is provided alone the rear edge of web 456 which engages the face 184 of adjustment tube 165 of the projection assembly 111 as will become apparent to raise the face 184 onto the carrier 455 when the carrier 455 is moved rearwardly in the machine. A handle 465 is provided across the front edge of web 456 for use in positioning carrier 455 and undercarriage 444.

A lower platen 466 is positioned over opening 460 where it is supported on flanges 461 and located by tabs 462 and side angles 474. The platen 466 is a generally rectangular sheet of clear glass. An upper platen 468 is pivotally positioned over lower platen 466 so that the microfiche 440 can be positioned between the two platens. Platen 468 includes a generally rectangular sheet 469 of clear glass mounted on a pivot rod 470 along its rear edge. Rubber treads 471 are mounted on opposite ends of rod 470 which rest on the top of web 456 between an abuttment 472 at the juncture of flange 464 with web 456 and the rear ends of sde angles 474 along opposite sides of opening 460. The rod 470 is located on sheet 469 so that sheet 469 will be parallel with platen 466 when it overlies same as seen by solid lines in FIG. 15. The pivot cams 452 on undercarriage 444 are provided with rearwardly facing inclined surfaces 475 which engage the upper portion of treads 471 to roll the treads 471 on the web and rotate the upper platen upwardly in a counterclockwise direction as seen in FIG. 15 when the carrier 455 has been pulled to its forwardmost position. This allows the mocrofiche to be placed between platens 466 and 468 to load same. As the carrier 455 is pushed rearwardly, the cams allow the upper platen to pivot down onto the microfiiche. The camming flange 464 also lifts the tube 165 as the carrier 455 is moved rearwardly so that its face 184 rests on the upper surface of the sheet 469 of the upper platen 466.

A pointer 476 is mounted on control panel 45 and is used with an interchangable grid 478 carried on web 456 to locate the particular image on the microfiche 440 to be viewed and/or printed.

ELECTRICAL CIRCUIT

The electrical circuit 500 of the invention is best seen in FIG. 26 and is connected to a conventional 110–120 volt A-C volt source. The circuit 500 includes a common hot wire 501 and a common ground wire 502 and is operatively associated with the drive and control means through the cycle stop switch 410, the light switch 411, and the registration switch 414 seen in FIGS. 3 and 22. The hot wire 501 includes a fuse 504, a safety switch 505 (FIG. 5), an an on-off switch 506 also shown in FIGS. 1 and 26 that connects the various components of the electrical circuitry to the power source. The safety switch 505 is closed when the cassette cover 40 is in position. The pump motor 260 that operates the fan-pump assembly 121 is connected between the hot wire 501 and ground wire 502 so that when the on-off switch 506 is closed, the pump motor will be driven to pump the toner in the developing tray 251, create a partial vacuum in pan 289 and to force cooling air over lamp 141 where it is heated and discharged through the opening 135 in light source assembly 110 across the discharge path of the developed copy paper.

The common contact $414_c$ of the registration switch 414 is connected to hot wire 501. The normally open contact $414_2$ of switch 414 is connected to timer motor $TM_m$ of timer TM an normally closed contact $411_2$ of light switch 411 in parallel with each other. The normally closed contact $414_1$ of switch 414 is connected to the common contact $410_c$ of the cycle stop switch 410. The normally open contacts $TM_c$ of timer TM are connected in parallel across the contacts $414_c$ and $414_1$ of switch 414. The other side of timer motor $TM_m$ is connected to ground wire 502. The timer TM is conventional and adjustable through knob $TM_k$ on panel 45 in FIGS. 1 and 3 to vary its timing cycle. When the timer TM times out, contacts $TM_c$ close until power is removed from its motor $TM_m$.

The normally open contact $411_1$ of light switch 411 is connected to normally closed contact $410_2$ of cycle stop switch 410 through normally open, momentary push button print switch 508. The contact $410_2$ is also connected to one side of main drive motor 378 with its other side connected to ground wire 502. The normally open contact $410_1$ is connected to one side of lamp 141 through wire 507. Wire 507 is also connected to the common contact $411_c$ of light switch 411. The other side of lamp 141 is connected to ground wire 502.

The corona power supply 509 is also connected to contact $410_2$ in parallel with motor 378 so that when power is supplied to motor 378, the power supply 509 will also be powered. The power supply 509 is conventional with direct current outputs $O_+$ and $O_{118}$ which are selectively connected to the corona units 245 and 246 through the charge selector switch 510.

The charge selector switch 510 as best seen in FIGS. 27 and 28 serves to selectively reverse the polarity of the electrostatic field imposed on the copy paper by the corona units 245 and 246. It is known that the polarity of the charge on the surface of the copy paper to be exposed will have the same polarity as the polarity of the corona unit facing that surface of the paper. Reference to FIG. 4 will show that the surface of the copy paper which is to be exposed is the forwardly facing surface as it passes between the corona units 245 and 246 and thus will have a charge thereon of the same polarity as the front corona unit 245. When the unit 245 is connected to the output $O_-$, the resulting electrostatic charge on the exposure surface of the copy paper will be negative and when the corona unit 245 is connected to the output $O_+$, the resulting charge on the copy paper will be positive. This feature of the invention is necessary since some pieces of microfiche 440 have positive images thereon, while others have negative images thereon. Switch 510 includes a pair of input contacts $I_1$ and $I_2$ with contact $I_1$ being connected to the positive output $O_+$ of the corona power supply 509 and the input $I_2$ being connected to the negative output $O_-$ of the corona power supply 509. The switch 510 also includes a pair of output contacts $O_1$ and $O_2$ which can be selectively connected to either of the inputs $I_1$ or $I_2$ through an actuator 511.

The contacts $I_1$, $I_2$ and $O_1$, $O_2$ are mounted by a housing 512 that is cylindrical and defining an actuator receiving cavity 514 therein which receives the actuator 511 therein. The input contacts $I_1$ and $I_2$ therein which receives the actuator 511 therein. The input contacts $I_1$ and $I_2$ are located on housing 512 so that they are diametrically opposed and output contacts $O_1$ and $o_2$ are also located by housing 512 so that they are diametrically opposed but shifted 90° with respect to the input contacts $I_1$ and $I_2$. This is best seen in FIGS. 27 and 28. The actuator 511 is rotatably mounted within the chamber 514 and housing 512 on a pivot shaft 515 which is rotatably mounted within housing 512. The shaft 515 extends through the control panel 45 of the machine and is equipped with a knob 516 as seen in FIG. 1 forwardly of control panel 45 so that the switch can be selectively operated. The actuator 511 includes a rotor 518 mounted on shaft 515 within the chamber 514 and connected to shaft 515 through a drive pin 519. The rotor 518 is cylindrical and defines a pair of diametrically opposed outwardly facing slots 520 along the outer surface of the rotor 518 and extending generally parallel to the rotational axis of the rotor 518.

A switch contact 521 is carried in each of the slots 520 for selectively connecting contacts $I_1$ and $I_2$ with contacts $O_1$ and $O_2$. Each contact 521 includes an inwardly extending protrusion 522 which fits within slot 520 to hold contact 521 in place and a pair of contact arms 524 which extend from protrusion 522 outwardly along the circumference of rotor 518. Each of the arms 524 is urged outwardly toward housing 512 by the natural resiliency in the contact 521 so that the outermost ends 525 of the arms 524 will be urged into contact with the contacts $I_1$, $I_2$, $O_1$ or $O_2$. The arms 524 extend outwardly so that the total length of each contact 521 extends for approximately 90° about the periphery of rotor 518 on either sides of slot 520. The natural resiliency of the protrusion 522 is also sufficient to maintain each contact within the slot 520. Thus, it will be seen that when the contact end 525 of the contact member 521 is contacting the input contact $I_1$, the opposite end 525 will be contacting either the output contact $O_1$ or $O_2$. Likewise when the contact end 525 of the other contact member 521 is contacting the input contact $I_2$, the other end will be contacting either the output contact $O_1$ or $O_2$.

The output contact $O_1$ is connected to the front corona unit 245 while the output contact $O_2$ is connected to the corona unit 246. Thus, it will be seen that when the rotor 518 is in the position shown in FIG. 27, the input contact $I_2$ will be connected to the output contact $O_1$ so that the front corona unit 245 has a negative charge imposed thereon thus creating a negative electrostatic charge on the copy paper. When the rotor 518 is rotated counterclockwise as seen in FIG. 27, it will be seen that the output contact $O_2$ will be connected to the input contact $I_2$ so that a negative charge will be imposed on the rear corona unit 246 and the electrostatic charge on the copy paper will be of a positive polarity.

A stop 530 on the back of rotor 518 co-operates with an abuttment 531 on housing 512 to limit the movement of rotor 518 between the position in which contact 521 connects the input contact $I_1$ with output contact $O_1$, and the position in which contact 521 connects the input contact $I_2$ with output $O_2$. Thus, the proper contact is insured.

This particular switch arrangement allows both positive and negative image microfiche to be copied without the necessity of changing the toner used to always produce a positive image on the copy.

OPERATION

In operation, it will be seen that the operator turns the machine "on" by closing the on-off switch 506. The microfiche 440 is placed in the machine by the operator pulling the fiche carrier 455 forwardly with handle 465 so that the upper platen 468 is pivoted upwardly by the cams 452 to open the platens 466 and 468. The microfiche 440 is then placed onto the lower platen 466 and the fiche carrier 455 pushed into the machine to close the upper platen 468 onto the lower platen 466 with the microfiche 440 therebetwee. Because the cycle stop cam 401 is in the position seen in FIG. 3, the switches 410 and 411 are both transferred so that the normally open contacts $410_1$ are closed and the normally open contacts $411_1$ are also closed. Thus, when the on-off switch 506 was closed to turn the machine on, the lamp 141 is illuminated through the normally closed contact $414_1$ of registration switch 414, the closed contact $410_1$ of the cycle stop switch 410 and ground wire 502 so that the light directed through the microfiche and the image is projected onto the viewing screen 49.

To locate the correct portion of the mircofiche 440 to be projected onto screen 49, the operator then moves the carrier 455 into or out of the machine and laterally of the machine so as to align the pointer 476 over the desired section of the grid 478. This generally locates the indicated portion of the visual image on the microfiche in alignment with the light path P from lamp 141 so that the visual image will be projected on the viewing screen as it passes upwardly to the fixed mirror assembly 112 along the portion $P_1$ where it is reflected downwardly and rearwardly along the portion $P_2$ of the path P and then reflected forwardly onto the screen 49 by the reflector assembly 222 which is now in its viewing position. The operator then focuses the image on the viewing screen 49 by turning the focusing knob 200 of focusing drive mechanism 195 which selectively moves the lens unit 166. The opperator may then rotate the driving gear 202 to selectively rotate the lens unit 166 and orient the image properly on the screen. The operator manipulates the charge selector switch 510 so that the contacts 521 properly connect the power supply 509 with the corona units 245 and 246 for a positive image to be formed on the copy paper regardless of whether the image on the microfiche is positive or negative.

It will also be noted that when the on-off switch 506 is closed, the motor 260 in the pump-fan assembly 121 is energized and remains energized as long as the machine is in its on position. This serves to continuously pump toner from the reservoir 250 into the paper submerging tray 251 to keep the toner both well mixed and a sufficient supply in tray 251 to develop the image on the copy paper. Simultaneously, it also causes the fan unit 264 to be continuously driven to create a partial vacuum through the upper flight of exposure belt 289 to hold the copy paper thereon. Also, the relatively cool air exhausting from the fan unit 264 is directed along duct 275 over the lamp 141. This cools the lamp 141 while heating the air. The thusly heated air is then exhausted from light source assembly 110 through opening 135 to dry the developed copy paper as it passes from the machine.

When the image has been properly focused on and aligned with the screen 49, the operator then depresses the momentary print switch 508 which is spring biased toward its open position. This momentarily energizes the main drive motor 378 and the corona power supply 509. Energizing the motor 378 drives the main drive chain 396 so that the stop cam 401 moves out of contact with the actuator arm 412 of switches 410 and 411 allowing them to return to their normal position. This causes contacts $410_2$ and $411_2$ to be closed so that power is maintained to motor 378 and corona power supply 509 through the normally closed contacts $414_1$ of switch 414 and the normally closed contacts $410_2$ of the switch 410. It will also be noted that the lamp 141 is de-energized when the switch 410 returns to its normal position to prevent premature exposurue of the copy paper.

When the main driven chain 396 is at its initial position shown in FIG. 3, the cutter drive arm 350 is held in its cocked position with latch 360 engaging the notch 356 in arm 350. As the chain 396 is moved around the sprockets by the motor 378, the secondary chain 398 drivingly engages the sprocket 384 to rotate the paper feed rolls 285 together so as to drive the web 102 of copy paper downwardly between the stationary blade 306 and the rotary blade 308 of the cutter means 16. This also drives the web 102 downwardly through the opening 248 between the corona units 245 and 246 so that the electrostatic charge is imposed thereon as the paper is fed downwardly. The leading edge of the paper engages the upper flight 290 of the exposure belt 289 as it moves downwardly and moves along with the upper flight 290 under the rool 298 so that the web 102 is held onto the upper flight 290 of the exposure belt 289. The partial vacuum exerted through the belt 290 by the fan-pump assembly 121 holds the web 102 onto the exposure belt. As the chain 396 continues to move, the secondary chain 398 clears the sprocket 384 so that the paper feed rolls 285 cease to rotate. At the instant the secondary chain 398 releases the sprocket 384, the trip cam 408 on chain 396 engages the trip 371 of latch 360 to pivot the latch 360 forwardly and cause the driving arm 350 to be released. This allows the spring 351 to pivot the driving arm 350 upwardly and rotate the blade 308 so that the web 102 is cut by the cutting edges 310 and 312. This cuts a sheet of copy paper of a prescribed length from the web 102 and allows it to pass down onto the upper flight 290 of the belt 289.

While the copy paper is being fed onto the upper flight of belt 289, the drive pin 405 on chain 396 has moved into engagement with the upper flanges 421 and 422 of bracket 420 to shift the driving arm 238 of the assembly 114 forwardly with chain 396. This transfers the shutter-mirror assembly 114 from its rearmost viewing position to its forwardmost printing position so that the reflector assembly 222 now covers the back side of the viewing screen 49 to block any light from entering the space 31 through screen 49. The pin 405 leaves the arm 238 in its forwardmost printing position and continues to move with the chain 396.

When the copy paper on the upper flight 290 of the exposure belt 289 reaches an exposure position so that the projected image from the microfiche 440 will be positioned within the confines of the sheets of copy paper, the registration cam 404 engages the actuating arm 415 of the registration switch 414 and transfers same. This causes the normally open contact $414_2$ of switch 414 to be closed to disconnect the main drive motor 378 and the corona power supply 509 from the power source and to connect the timer motor $TM_m$ of timer TM to the power source. At the same time, the closure of contact $414_2$ also connects the lamp 141 to the power source through the normally closed contacts $411_2$ of the light switch 411. This projects the image from the microfiche 440 onto the electrostatically charged sheet of copy paper on the upper flight 290 reflector assembly 222 and onto the upper charged surface of the copy paper. It will also be noted that because it may be necessary to vary the exposure time during which the charge copy paper is exposed, the timer TM is of the variable type with a know $TM_k$ on the control panel 45 for selectively controlling same.

After a prescribed period of time which is determined by the setting of the know $TM_k$, the timer motor $TM_m$ times out and the normally open contact $TM_2$ is closed so that the main drive motor 378 is again energized through the normally closed contacts $410_2$ of the cycle stop switch 410 while at the same time powering the corona power supply 509. This moves the chain 396 so that the registration cam 404 is moved out of engagement with the registration switch 414 to allow the switch to return to its normal position. Thus, it will be seen that during the exposure of the copy paper on the exposure belt 289, the chain 396 is not moving and the exposure belt 289 is held in a stationary position with the copy paper in registration with the projected image from the microfiche. Also, since the timer TM times out, the lamp 141 is de-energized so as to prevent over exposure of the copy paper.

As the chain 396 continues to move, the exposure belt 289 is again moved to cause the exposed copy paper to be fed through the toner in the tray 251 of the developing unit 119 and into engagement with the squeegee rolls 300 of the discharge roll assembly 284 to develop the latent image on the copy paper. It will also be noted that the drive chain 396 is rotation the rolls 300 together so as to force the copy paper out of the machine through the discharge slot 42 and cover 41. The squeegee rolls 300 are of such construction that the excess toner will be squeezed from the developed copy. Also, the heated air discharged from the box 125 of the light source assembly 110 is directed onto the paper to heat and dry same. When the developed copy has been discharged, the chain 396 has again reached the position shown in FIG. 3 where the stop cam 401 again engages the actuator arm 412 of the switches 410 and 411 to transfer them back to their initial position. This completes the cycle of the machine.

While the chain 396 is moving the copy through the developing unit 119 and out between the rolls 300, the drive pin 405 engages the lower flanges 430 and 431 on the driving arm 238 and moves the reflector assembly 222 back to its viewing position. Also, the pin 405 has moved past the drive arm 350 of the knife assembly 305 to move the arm 350 down to its cocked position as seen in FIG. 3 ready for the next printing operation.

MICROFILM CONVERSION

Figure 29:
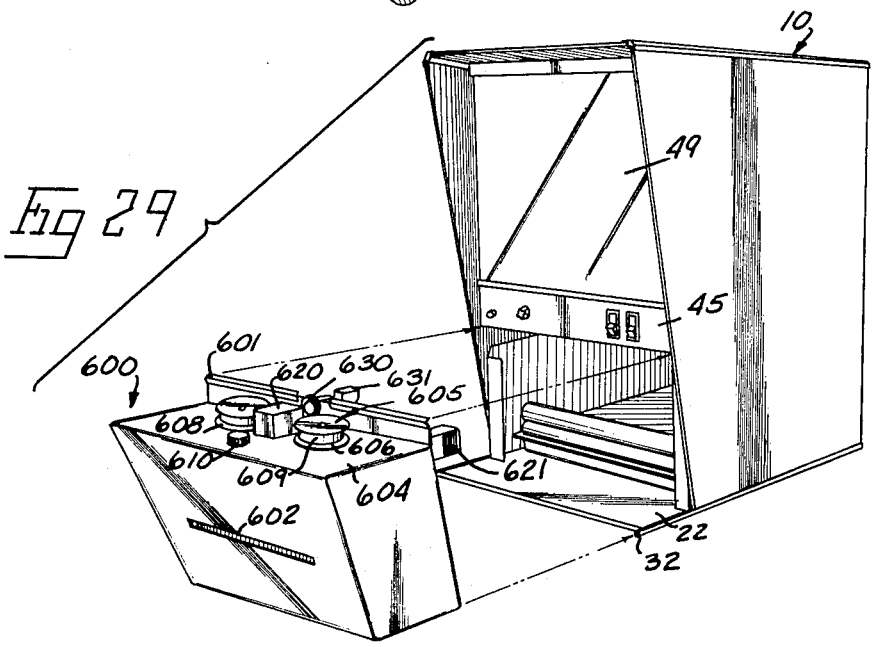
FIG. 29 is an exploded perspective view of the machine showing its use with roll microfilm.

For using the machine 10 with roll type microfilm, a microfilm conversion unit 600 is provided as seen in FIG. 29. The conversion unit 600 replaces the paper exit cover 41 of the machine cover 21, the light source assembly 110 and the focusing lens assembly 162 of the projection unit 111. The above enumerated units are removed from the machine prior to the installation of the conversion unit 600. Also, the carrier assembly 18 is removed prior to the mounting of the conversion unit 600.

It will be seen that the conversion unit 600 conforms in external appearance generally to the configuration of the paper exit cover 41 and is provided with a paper exit slot 602 corresponding to the paper exit slot 42 in the cover 41. The upper rear edge of the unit 600 is provided with an upstanding bracket 601 adapted to conform with an engage the front race flange 442 of the race 441 mounted in the slot 44 of the machine frame 20. The lower edges of the conversion unit 600 are adapted to sit within the bottom channel 32 on opposite sides of the machine frame 20 similarly to the paper exit cover 41. Thus, it will be seen that the conversion unit 600 is mounted on the machine by placing the upstanding mounting bracket 602 behind the race 442 and placing the lower outside of edges of the unit 600 within the bottom channels 32. The unit 600 defines a substantially horizontally oriented working surface 604 on which the microfilm drive mechanism 605 is mounted.

The microfilm drive mechanism is of the reversing and variable speed type as is conventional in the microfilm reader-printer art with take-up and play-out reels 606 and 608 between which the rolls of microfilm 609 is mounted. An appropriate control 610 is provided which allows the direction of movement of the microfilm between the reels 606 and 608 to be selectively changed as well as the rate at which the transfers is taking place to be changed. The microfilm 609 passes through a guide assembly (not shown) as is known in the art for selectively positioning the roll of microfilm 609 for projection of the visual image thereon onto the screen 49 of the machine.

A light source assembly 620 is mounted forwardly of the film guide of the machine and has a construction similar to the construction of the light source assembly 110. A duct 621 is associated to the light source assembly 620 to connect the cooling air from the duct 235 into the light source assembly 620 to cool same. The heated air exiting from the light source assembly 620 may be directed downwardly onto the developed copy paper to dry same in a manner similar to that previously disclosed for the light source assembly 110.

A projection assembly 630 is mounted behind the film guide for focusing and orienting the projected image from the roll of microfilm similarly to the projection unit 111. An appropriate prism 631 is provided behind and aligned with both the projection unit 630 and the aperture 161 in the platform 160 in the machine so that the projected image is deflected from a rearwardly oriented path upwardly through the aperture 161 along the path P as set forth previously. Thus, because the paper exit cover 41, the light source assembly 110, the lens assembly 162 anad the carriage assembly 18 can be easily removed from the machine 10 and the conversion unit 600 substituted therefor, the machine 10 can be easily converted from a machine for reading and printing microfiche to a machine for reading and printed roll microfilm.

ALTERNATE EMBODIMENT OF TIME DELAY MEANS

Figure 30:
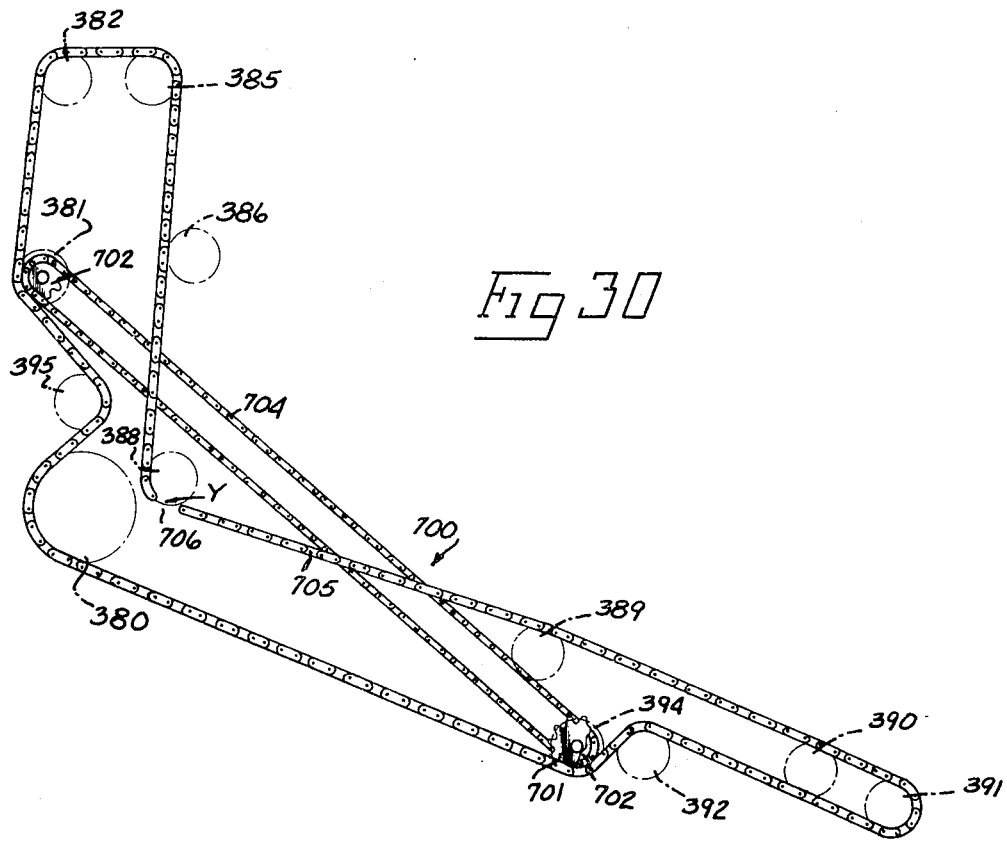
FIG. 30 is a schematic view of the main drive chain showing a time delay mechanism.
Figure 31:
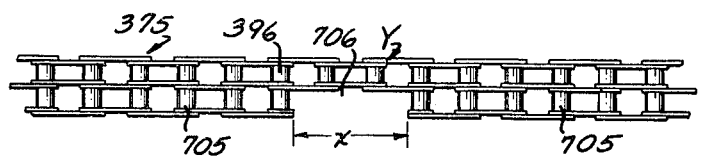
FIG. 31 is a view taken along line 31—31 in FIG. 30.
Figure 32:
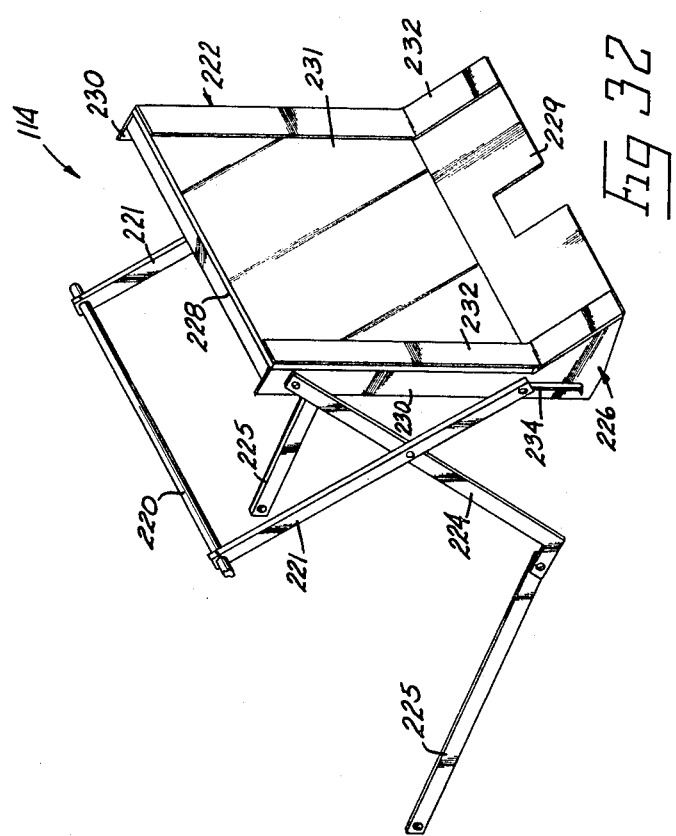
FIG. 32 is a perspective view of the shutter-mirror assembly.

Referring now to FIGS. 30 and 31, an alternate form of the exposure time delay means for the machine is illustrated. The time delay means 700 is mechanical rather than electrical as disclosed in the first embodiment of the invention. The means 700 includes the main drive chain 396 which passes around the sprockets as enumerated in the first embodiment of the invention. It will be noted, however, that the sprockets 381 and 394 over which the endless chain 396 passes are idler sprockets rotatably mounted on the support shafts of the upper and lower belt drive rolls 288 of the assembly 282 so as to be moved independently of the rolls 288. Mounted outboard of and immediately adjacent the lower sprocket 394 is a drive sprocket 710 which is pinned to the support shaft of the lower belt drive roll 288 for rotating same. Transfer sprockets 702 are pinned to the support shafts of the upper and lower belt drive rolls 288 behind sprocket 381 and 394 and a transfer chain 704 connects these sprockets so that when the lower drive roll 288 is rotated, the upper drive roll 288 will be correspondingly rotated.

Mounted on the main drive chain 396 on the outside thereof is a conveyer belt drive chain 705 which has a finite length slightly shorter than the length of the main drive chain 396 as seen in FIG. 31. The chain 705 is mounted on the chain 396 in such a manner that they move as a single unit. The chain 705 is positioned on the chain 396 so as to leave a space 706 between the ends thereof at point Y on the main drive chain 396. The space 706 has a length x such that when point Y on the main drive chain reaches the position corresponding to that position at which point E on the original drive chain 396 reaches the registration switch 414, the chain 705 will disengage the drive sprocket 701 mounted on the support shaft of the lower belt drive roll 288 to stop the movement of the conveyor belt 289 for exposure. The space 706 is selected so that the conveyor belt 289 will be stopped for an average exposure time for the copy paper on the upper flight of the belt 289. An appropriate control (not shown) may be provided which is connected to the lamp 141 to vary the intensity of the light from lamp 141 to provide a fine adjustment for the correct exposure of the copy paper. Thus, the belt 289 will be stopped for a prescribed period of time and will then be re-engaged by the chain 705 to continue the movement of the copy paper through the machine.

The secondary link chain 398 is mounted outboard of the chain 705 and the drive sprocket 384 which is engaged by the chain 398 is appropriately moved on the support shaft of the paper feed roll to accomodate this change in the flexible transfer member 375.

It is also understood that the original time delay means embodied in the timer TM may be changed so that the time delay is constant and the light intensity may be varied to obtain the proper exposure of the copy paper on the exposure belt 289.

We claim:
1. In a microfilm reader-printer apparatus for copying images from microfilm onto copy paper including image forming means for reproducing the image of the microfilm on the copy paper and a viewing sceen, the improvement comprising:
   image projection means for projecting the image from the microfilm into said image forming means to cause the image to be reproduced on said copy paper;
   projection transfer means for selectively transferring the projected image from said image projection means onto said viewing screen while preventing said projected image from reaching said image forming means when said projection transfer means is in a first position and for allowing said projected image to reach said image forming means when said projection transfer means is in a second position, said projection transfer means constructed and arranged to be constantly urged toward said first position;
   a drive motor having a rotary output shaft;
   a driving member carried by and rotatable with said output shaft;
   a flexible endless transfer member connected to and moved by said driving member along a prescribed path in a first direction;

a driving element mounted on and movable with transfer member along said prescribed path;

a first driven element operatively connected to said projection transfer means; said first driven element constructed and arranged to be engaged by and moved with said driving element at the speed of movement of said driven element to move said projection transfer means from said first position to said second position as said driving element is moved along a first predetermined portion of said prescribed path in said first direction by said transfer member and for releasing said first driving element when said projection transfer means reaches said second position;

a second driven element operatively connected to said projection transfer means; said second driven element constructed and arranged to be engaged by and moved with said driving element at the speed of movement of said driven element to move said projection transfer means from said second position to said first position as said driving element is moved along a second predetermined portion of said prescribed path in said first direction by said transfer member and for releasing said second driving element when said projection transfer means reaches said first position; and, holding means for resiliently and releasably maintaining said projection transfer means in said second position when said projection transfer means is moved to said second position.

2. In a microfilm reader-printer apparatus as set forth in claim 1 wherein said first driven element includes a pair of spaced apart first flange, said first flanges defining an entrance space to allow said driving element to move between and engage said flanges to move said projection transfer means from said first to said second position and defining an exit space to allow said driving element to move from between said first flanges and disengage said flanges with said projection transfer means in said second position; and, wherein said second driven element includes a pair of spaced apart second flanges, said second flanges defining an entrance space to allow said driving element to move between and engage said flanges to move said projection transfer means from said second to said first position and defining an exit space to allow said driving element to move from between said second flanges and disengage said flanges with said projection transfer means in said first position.

3. In a microfilm reader-printer apparatus as set forth in claim 1 wherein said projection transfer means includes a driving arm pivotally movable between a first pivotal position in which said projection transfer means is in said first position, and a second pivotal position in which said projection transfer means is in said second position, said first driven element carried by said driving arm and movable therewith along a first arcuate path and said second driven element carried by said driving arm and movable therewith along a second arcuate path, said first and second predetermined portions of said prescribed path of said endless transfer member being generally straight, said first predetermined portion of said prescribed path oriented so that said driving member intersects said first arcuate path of said first driven element generally at said first and second pivotal positions of said driving arm as said driving member moves along said first predetermined portion of said prescribed path of said endless transfer member, and said second predetermined portion of said prescribed path oriented so that said driving member intersects said second arcuate path of said first driven element generally at said first and second pivotal positions of said driving arm as said driving membe moves along said second predetermined portion of said prescribed path of said endless transfer member.

4. In a microfilm reader-printer apparatus as set forth in claim 3 wherein said first driven element includes a pair of spaced apart first flange, said first flanges defining a first entrance space in registration with the point of intersection between said driving member and said first arcuate path when said driving arm is in said first pivotal position to allow said driving arm from said first pivotal position to said second pivotal position, said first flanges further defining a first exit space in registration with the point of intersection between said driving arm at said second pivotal position, and, wherein said second driven element includes a pair of spaced apart second flanges, said second flanges defining a second entrance space in registration with the point of intersection between said driving member and said second arcuate path when said driving arm is in said second pivotal position to allow said driving arm from said second pivotal position to said first pivotal position, said second flanges further defining a second exit space in registration with the point of intersection between said driving member and said second arcuate path when said driving arm is in said first pivotal position to allow said driving element to disengage said second flanges and said driving arm at said first pivotal position.

* * * * *